United States Patent
Schlesinger et al.

(10) Patent No.: US 10,262,066 B2
(45) Date of Patent: Apr. 16, 2019

(54) CROWD-SOURCED NATIVE APPLICATION CRAWLING

(71) Applicant: Samsung Electronics Co., Ltd., Suwon-si, Gyeonggi-do (KR)

(72) Inventors: Mor Schlesinger, Ramat Hasharon (IL); Shiran Schwartz, Tel Aviv-Yafo (IL); Naor Rosenberg, Elyakhin (IL)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 14/981,829

(22) Filed: Dec. 28, 2015

(65) Prior Publication Data

US 2016/0188720 A1 Jun. 30, 2016

Related U.S. Application Data

(63) Continuation-in-part of application No. 14/582,763, filed on Dec. 24, 2014.

(51) Int. Cl.
*G06F 17/30* (2006.01)
*H04L 29/08* (2006.01)
*H04L 29/06* (2006.01)

(52) U.S. Cl.
CPC .. *G06F 17/30864* (2013.01); *G06F 17/30861* (2013.01); *H04L 67/1097* (2013.01); *H04L 67/42* (2013.01); *H04L 67/02* (2013.01); *H04L 67/025* (2013.01)

(58) Field of Classification Search
CPC .............................................. G06F 17/30861
See application file for complete search history.

(56) References Cited

U.S. PATENT DOCUMENTS

| 9,002,777 | B1* | 4/2015 | Muddu ................. G06Q 10/00 707/694 |
| 9,448,961 | B1* | 9/2016 | Cohen ..................... G06F 15/16 |
| 2011/0125587 | A1 | 5/2011 | Netzer et al. |
| 2012/0109930 | A1* | 5/2012 | Prasad .................. G06F 9/5027 707/709 |
| 2013/0173581 | A1* | 7/2013 | Kreichman ....... G06F 17/30864 707/709 |
| 2013/0226681 | A1 | 8/2013 | Bastos et al. |
| 2014/0023691 | A1 | 1/2014 | Melander et al. |

(Continued)

*Primary Examiner* — Grace Park
(74) *Attorney, Agent, or Firm* — Jefferson IP Law, LLP

(57) ABSTRACT

A method for performing crowd-sourced native application crawling is disclosed. The method includes determining a list of installed native applications installed on a user device and determining whether a set of crawling conditions are met. The method includes generating a work request in response to the set of crawling conditions being met by the user device and transmitting the work request to a content acquisition server. The work request includes the list of installed native applications. The method includes receiving a crawling task including an application access mechanism corresponding to a state of a native application. The method include launching the native application and setting the state of the native application based on the application access mechanism. The native application issues a content request to a content server. The method further includes receiving the content from the content server and transmitting the content to the content acquisition server.

20 Claims, 10 Drawing Sheets

(56) References Cited

U.S. PATENT DOCUMENTS

2014/0032691 A1\* 1/2014 Barton .................... H04L 41/00
 709/206
2015/0127663 A1 5/2015 Tseng
2015/0242510 A1\* 8/2015 Shapira ............. G06F 17/30392
 707/706
2016/0275190 A1 9/2016 Seed et al.

\* cited by examiner

CROWD-SOURCED NATIVE APPLICATION CRAWLING

PRIORITY CLAIM

This application is a continuation-in-part of U.S. patent application Ser. No. 14/582,763 filed Dec. 24, 2014. The entire disclosure of the application referenced above is incorporated herein by reference.

TECHNICAL FIELD

This disclosure relates to crowd-sourced crawling of software applications.

BACKGROUND

Search engines are an integral part of today's world. A key component of a search engine is the collection of search indexes that power the search. In the context of a search engine, a search index can be an inverted index that associates keywords or combinations of keywords to documents (e.g., web pages) that contain the keyword or combination of keywords. In order to generate and maintain these search indexes, most search engines utilize crawlers to identify documents and information within the documents. A traditional crawler requests a document from a content provider and the content provider provides the requested document to the crawler. The crawler then identifies and indexes the keywords and combinations of keywords in the document.

As the world transitions to a mobile-based architecture, the way content providers provide access to their content is changing. User devices can access content using a variety of different mechanisms. For example, user devices can obtain content from a content provider using a native application dedicated to accessing a software application of the content provider or a web browser that accesses the software application using a web browser. Furthermore, content providers may allow access to different content depending on the geographic region of a user device, the type of user device, the time of day, and/or the operating system of the user device. Thus crawling has become an increasingly difficult task.

SUMMARY

According to some implementations of the present disclosure, a method for performing crowd-sourced crawling is disclosed. The method includes determining a list of installed native applications that are installed on a user device and determining whether a set of crawling conditions are met by the user device. The method further includes generating a work request in response to the set of crawling conditions being met by the user device and transmitting the work request to a content acquisition server. The work request includes the list of the installed native applications. The method includes receiving a native application crawling task including an application access mechanism corresponding to a state of a native application identified in the list of installed native applications. The method include launching the native application indicated in the native application crawling tasks and setting the state of the native application based on the application access mechanism. The native application issues a content request to a content server in response to being set to the state. The method further includes receiving the content from the content server via the native application and transmitting the content to the content acquisition server.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
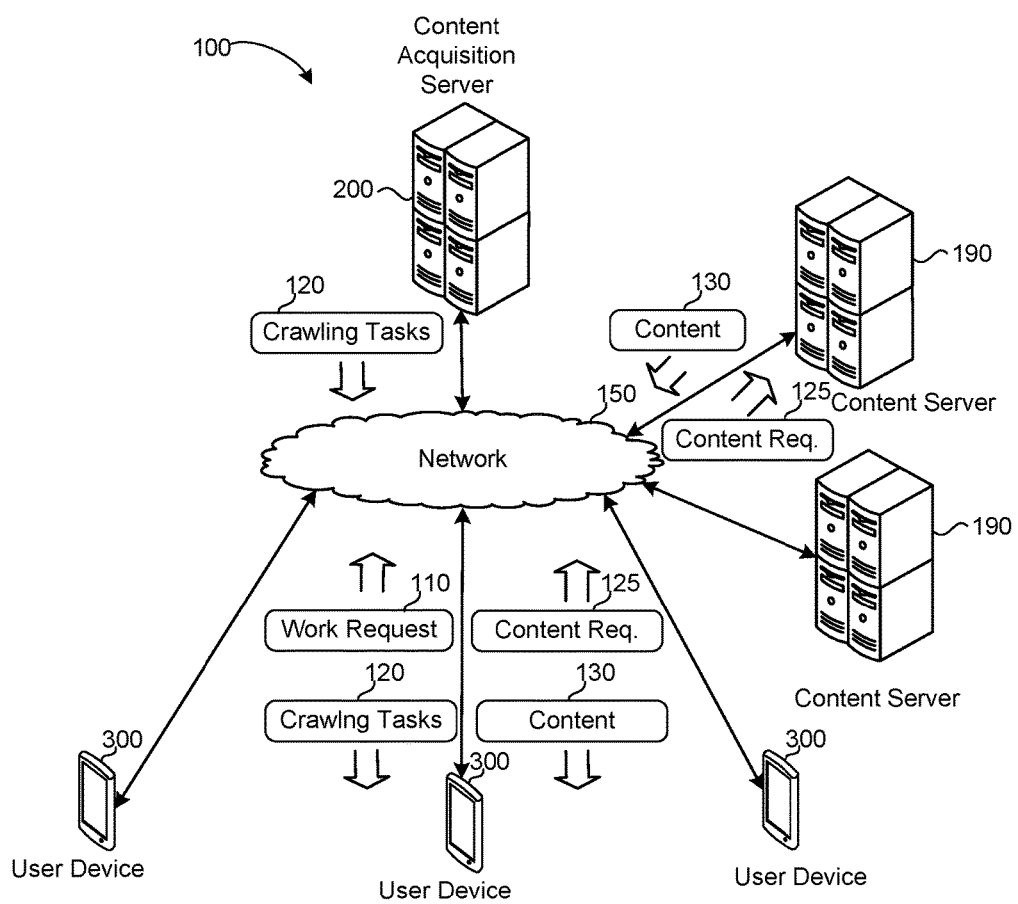
FIG. 1A is a schematic illustrating an example environment of a content acquisition system.

FIG. 1A illustrates an example environment 100 of a crowd-sourced content acquisition system. A content acquisition system can include a content acquisition server 200 and a plurality of user devices 300. A content acquisition server 200 is a collection of one or more computing devices that crawls content 130 provided by content servers 190. Examples of content servers 190 include web servers and application servers. In some examples, the content 130 provided by content servers 190 are web pages and other online documents that can be accessed via web browser of a user device 300. Content 130 may also include documents that are accessible via a native application. The content 130 can include text, images, videos, metadata, and/or layout data corresponding to a state of an application (web or native).

A user device 300 is a consumer grade computing device that is owned and operated by a user. While the user device 300 is depicted as a smartphone, a user device can be any suitable user computing device including, but not limited to, a tablet computing device, a personal computing device, a laptop computing device, a gaming device, a vehicle infotainment device, and/or a smart appliance (e.g., smart refrigerator or smart television). The user device 300 is typically not under control of the content acquisition server 200, except that a user has explicitly allowed the user device 300 to perform crawling tasks 120 on behalf of the content acquisition server 200. Thus, the content acquisition server 200 utilizes computing resources of the unaffiliated user devices 300 to crowd-source crawling tasks 120. In this way, the content acquisition system may be referred to as being "crowd-sourced." The content acquisition system is configured to crawl software applications.

A software application can refer to a software product that causes a computing device to perform a function. In some examples, a software application may also be referred to as an "application," "an app," or a "program." Example software applications include, but are not limited to, productivity applications, news applications, social media applications, messaging applications, media streaming applications, social networking applications, and games. Software applications can perform a variety of different functions for a user. For example, a restaurant reservation application can make reservations for restaurants. As another example, an internet media player application can stream media (e.g., a song or movie) via the Internet. In some examples, a single software application can provide more than one function. For example, a restaurant reservation application may also allow a user to retrieve information about a restaurant and read user reviews for the restaurant in addition to making reservations. As another example, an internet media player application may also allow a user to perform searches for digital media, purchase digital media, generate media playlists, and share media playlists. The functions of an application can be accessed using native application editions of the software application and/or web application editions of the software application.

Web application editions (also referred to as "web applications") of a software application may be partially executed by a user device 300 (e.g., by a web browser executed by the user device 300) and partially executed by a remote computing device (e.g., a web server or application server). For example, a web application may be an application that is executed, at least in part, by a web server and accessed by a web browser (e.g., a native application) of the user device 300. Example web applications may include, but are not limited to, news websites, blogging websites, restaurant review websites, online auctions websites, social-networking websites, travel booking websites, and online retail websites. A web application accesses functions of a software product via a network 150. Examples implementations of web applications include web sites that serve webpages and/or HTML-5 application editions.

A native application edition (or "native application") is, at least in part, installed on a user device 300. In some scenarios, a native application is installed on a user device 300, but accesses an external resource (e.g., an application server) to obtain data and/or instruction from the external resource. For example, social media applications, weather applications, news applications, and search applications may respectively be accessed by one or more native application editions that execute on various user devices 300. In such examples, a native application can provide data to and/or receive data from the external resource while accessing one or more functions of the software application. In other scenarios, a native application is installed on the user device 300 and does not access any external resources. For example, some gaming applications, calendar applications, media player applications, and document viewing applications may not require a connection to a network 150 to perform a particular function. In these examples, the functionality of the software application is encoded in the native application editions itself. The native application edition is able to access the functions of the software application without communicating with any other external devices.

The content acquisition server 200 communicates with a plurality of user devices 300 via a network 150. The content acquisition server 200 transmits crawling tasks 120 to a user device 300. In some implementations, a user device 300 transmits a work request 110 to the content acquisition server 200 when the user device 300 is available to acquire content on behalf of the content acquisition server 200. A user device 300 may utilize a set of crawling conditions 322 to determine if it is available to acquire content. Examples of crawling conditions 322 include, but are not limited to, whether the user device 300 is connected to a power source, whether the user device 300 is connected to Wi-Fi, and whether the display of the user device 300 is off. The foregoing list of crawling conditions is provided for example only and variations of the crawling conditions are within the scope of the disclosure. For instance, a crawling condition may be that the device is connected to a 3G/4G connection but not in data roaming mode or that the display of the device is in "sleep mode." When the crawling conditions 322 of a user device 300 are met, the user device 300 generates a work request 110 and transmits the work request 110 to the content acquisition server 200. In some implementations, a work request 110 merely indicates that the user device 300 is able to perform crawling tasks 120. Additionally, a work request 110 can include, but is not limited to, a location (e.g., a geolocation or geographic region) of the user device 300, a type of the user device 300, and/or an operating system type of the user device 300. In this way, the content acquisition server 200 can determine appropriate crawling tasks 120 to assign to a requesting user device 300 given its location, device type, and/or operating system type. In configurations where the user device 300 is configured to crawl native applications, the work request 110 can also include a list of native applications installed on the user device 300. In these implementations, the crawling conditions may include application-specific crawling conditions, discussed in greater detail below.

The content acquisition server 200 receives a work request 110 from a user device 300 and determines crawling tasks 120 to assign to the user device 300 based on the work request 110 and the crawling tasks 120 that are needed to be performed by the content acquisition server 200. For example, the content acquisition server 200 may need to crawl a software application that offers different content 130 to users based on the location of the users. For instance, the software application may provide social events (e.g., parties) that are occurring in specific geographic regions, whereby only devices 300 in a particular geographic region can obtain the event listings for that particular region. When a user device 300 in the particular region provides a work request 110 to a content acquisition server 200, the content acquisition server 200 may provide a crawling task 120 to the user device 300 instructing the user device 300 to acquire content 130 from the particular software application. In another example, a software application may deliver first content 130 to a user device 300 running a first operating system and similar but different second content 130 to a user device 300 running a second operating system. In this example, the content acquisition server 200 may receive work requests 110 from both user devices 300 and may assign the same crawling tasks 120 to the user devices 300, so that it may discover the overlapping first and second content 130.

According to the implementations of this disclosure, the content acquisition server 200 is able to crowd source crawling tasks using hundreds, thousands, or millions of user devices 300. The content acquisition server 200 can distribute crawling tasks 120 to user devices 300 across the world and without having to circumvent anti-crawling mechanisms of the content servers 190. Furthermore, the content acquisition server 200 can collect content 130 that is meant for specific geographic regions and/or specific device types or operating systems by virtue of the fact that user devices 300, such as smartphones, tablets, and computers, are used across the world and that the user devices 300 are of different types and execute different operating systems.

Crawling tasks 120 can include any suitable procedures to obtain content from a third party resource. Examples of crawling tasks can include web crawling, API crawling, and application crawling. In some implementations, the crawling tasks 120 include a set of access mechanisms. Each access mechanism represents a different crawling task 120. An access mechanism is one or more strings that a computing device (e.g. a user device 300) utilizes to access a state of an application. Examples of access mechanisms include web access mechanisms, application access mechanisms, and scripts. A web access mechanism may be a string that includes a reference to a web application edition of a software product, and indicates one or more operations for a web browser to execute. A web access mechanism may be a resource identifier that includes a reference to a web resource (e.g., a page of a web application/website). For example, a web access mechanism may refer to a uniform resource locator (URL) used with hypertext transfer protocol (HTTP). If a user selects a user selectable link including a web access mechanism, the user device 300 may launch a web browser application if the web browser is not currently running and may pass the resource identifier to the web browser. The web browser can utilize the resource identifier to retrieve the web resource indicated in the resource identifier and/or access a function of the software application indicated by the resource identifier.

An application access mechanism may be a string that includes a reference to a native application (e.g., a custom namespace of the software application specific to one or more native application editions of the software application) and indicates one or more operations for the user device 300 to perform. An application access mechanism causes a user device 300 to launch a native application indicated by the application access mechanism and to perform one or more operations to set the state of the native application to the state indicated by the application access mechanism. In some implementations, any combination of the operating system of the user device 300, a search application executed by the user device 300, a native application executed by the user device 300, and/or a web browser executed by the user device 300 can launch the native application referenced in the application access mechanism An application resource identifier is an example application access mechanism. An application resource identifier refers to a uniform resource identifier used to access a native application on a particular platform. It is noted that some software applications may have a common scheme for accessing all of their respective native application editions. In such scenarios, a single application resource identifier may access multiple native application editions. Furthermore, in some scenarios a native application is not accessible using an application resource identifier. In these scenarios, an application access mechanism may be a series of commands that the user device 300 may perform to access the desired state. In some implementations, the series of commands replicate commands that are issued when a user interacts with the graphical user interface of a native application. For example, the series of commands may be a series of intents.

As will be discussed below, a user of a user device 300 can elect to download a crawling application 318 (FIG. 3) to his or her user device 300. The crawling application 318 transmits work requests 110 to the content acquisition server 200 and requests content 130 from a content server 160 in response to receiving a crawling tasks 120 from the content acquisition server 200. In some implementations, the crawling application 318 acts as a background process and does not operate until the user is not using the user device (e.g., when the crawling conditions are met). In some implementations, users may be rewarded for using the crawling application 318 or allowing the crawling application 318 to operate on the user device 300. For instance, a user may designate a charity that he or she wishes to have funds donated on his or her behalf. Each time the user device 300 performs a crawling task 120, the operator of the content acquisition server 200 may make a charitable donation on behalf of the user of the user device 300. In another example, each time the user device 300 executes a crawling task 120 the user is entered into a drawing for a prize (e.g., a cash prize). In other implementations, each time the user device 300 executes a crawling task 120, the operator of the content acquisition server 200 credit the user with a small amount of funds (e.g., one cent for each ten crawling tasks 120 completed).

Figure 1B:
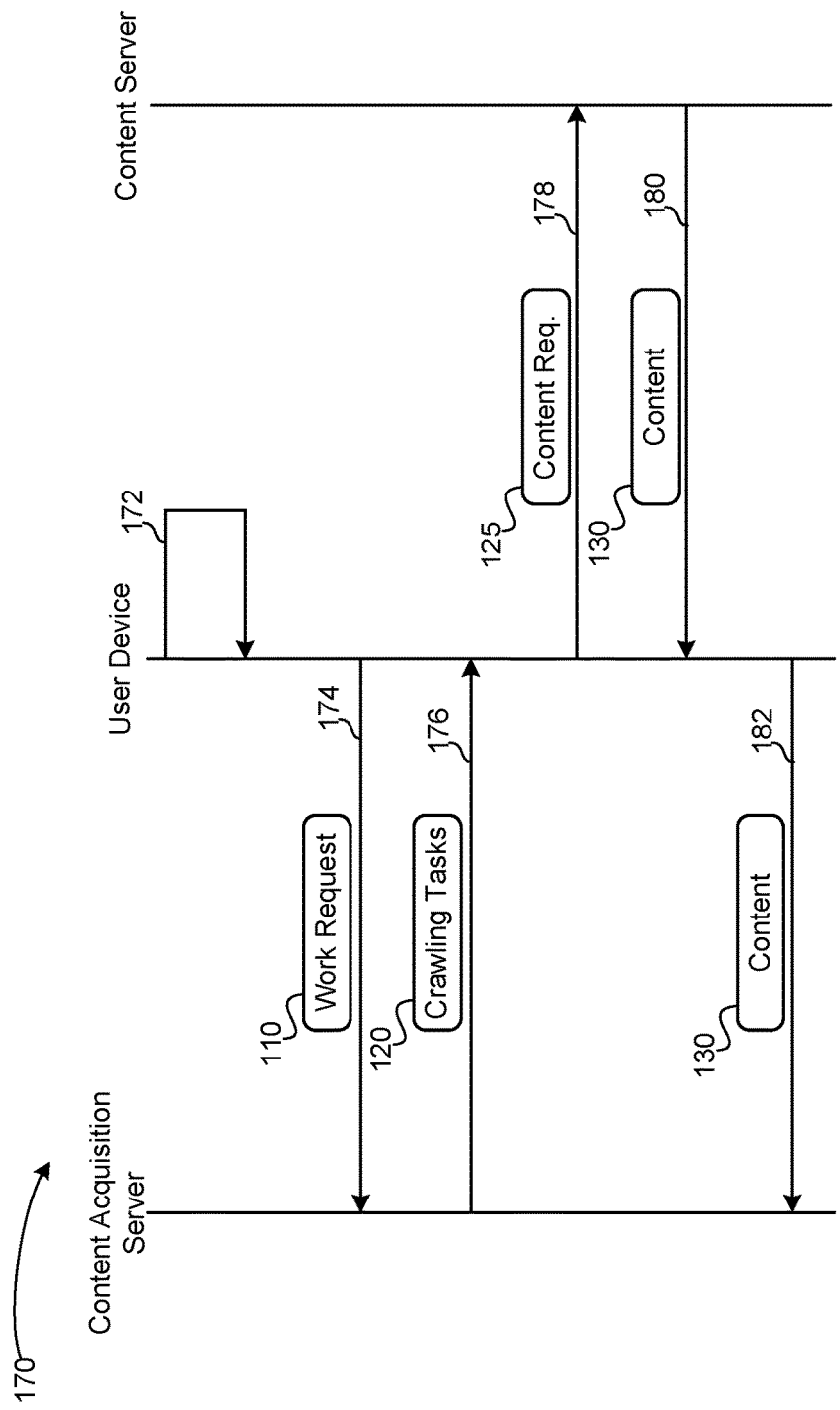
FIG. 1B is an example swim-lane diagram illustrating an example data flow between a content acquisition server, a user device, and a content server.

FIG. 1B is a swim-lane diagram 170 illustrating an example data flow between a content acquisition server 200, a user device 300, and a content server 190. While only one content server 190 is shown, the user device 300 may be in communication with multiple content servers 190. Additionally, the content acquisition server 200 can communicate with multiple user devices 300.

At transition 172, the user device 300 determines whether its crawling conditions 322 are met. For example, the user device 300 can determine whether it is connected to an external power source, whether it is connected to the network 150 via Wi-Fi or a LAN connection, and whether the display of the user device 300 is off. The crawling conditions may include other suitable conditions such as whether the accelerometer signal indicates that the device 300 is not moving. The crawling conditions may be initially set in accordance with default settings. In some implementations, a user can adjust the crawling conditions 322 to increase or decrease the amount of crawling the user device 300 performs. For example, the user may select the crawling conditions from, for example, a menu of possible crawling conditions.

At transition 174, the user device 300 transmits a work request 110 to the content acquisition server 200. In doing so, the user device 300 may determine a location (e.g., a geolocation) of the user device 300. The user device 300 may include the location as well as the device type and operating system type of the user device 300 in the work request 110.

At transition 176, the content acquisition server 200 transmits the crawling tasks 120 to the user device 300. The content acquisition server 200 can determine the crawling tasks 120 based on the information conveyed in the work request 110. For instance, the content acquisition server 200 may determine whether there are any tasks that are specific to a geographic area of the user device 300 or are specific to the device type or operating system type of the user device 300. If so, the content acquisition server 200 may provide these crawling tasks 120 to the user device 300. Additionally or alternatively, the content acquisition server 200 may provide general crawling tasks 120 that do not require any special attributes of the user device 300. In some implementations, the crawling tasks 120 are communicated as a set of web resource identifiers (e.g., URLs). Additionally or alternatively, the crawling tasks 120 can contain other types of access mechanisms.

At transition 178, the user device 300 transmits a content request 125 to a content server 160. In this way, the user device 300 begins performing one of the crawling tasks 120. The user device 300 determines the address of the content server 160 from the access mechanism corresponding to the crawling task 120. For example, the user device 300 may transmit the content request 125 to the content server 190 using a URL that is used to access the content server 160. In some implementations, the content request 125 is an HTTP request. Although the disclosure makes reference to HTTP requests, the content request 125 may be any other suitable request. For example, the content request 125 may be a Representational State Transfer (REST) request or a Simple Object Access Protocol (SOAP) request.

At transition 180, the user device 300 receives the requested content 130 from the content server 160. The content 130 may be a document represented in HTML, Extensible Markup Language (XML), JavaScript Object Notation (JSON), or any other suitable format. At transition 182, the user device 300 forwards the received content 130 to the content acquisition server 200. In some implementations, the user device 300 waits until it has completed all of its crawling tasks 120 before sending the content 130 collected by way of completing all of the crawling tasks. The user device 300 can package the content 130 in a container prior to transmission. For example, the user device 300 can package the content 130 in a JSON file and then transmit the JSON file to the content acquisition server 200. Upon receiving the content 130, the content acquisition server 200 scrapes the received content 130. The content acquisition server 200 may utilize any suitable scraping methods to scraping the content 130.

Figure 1C:
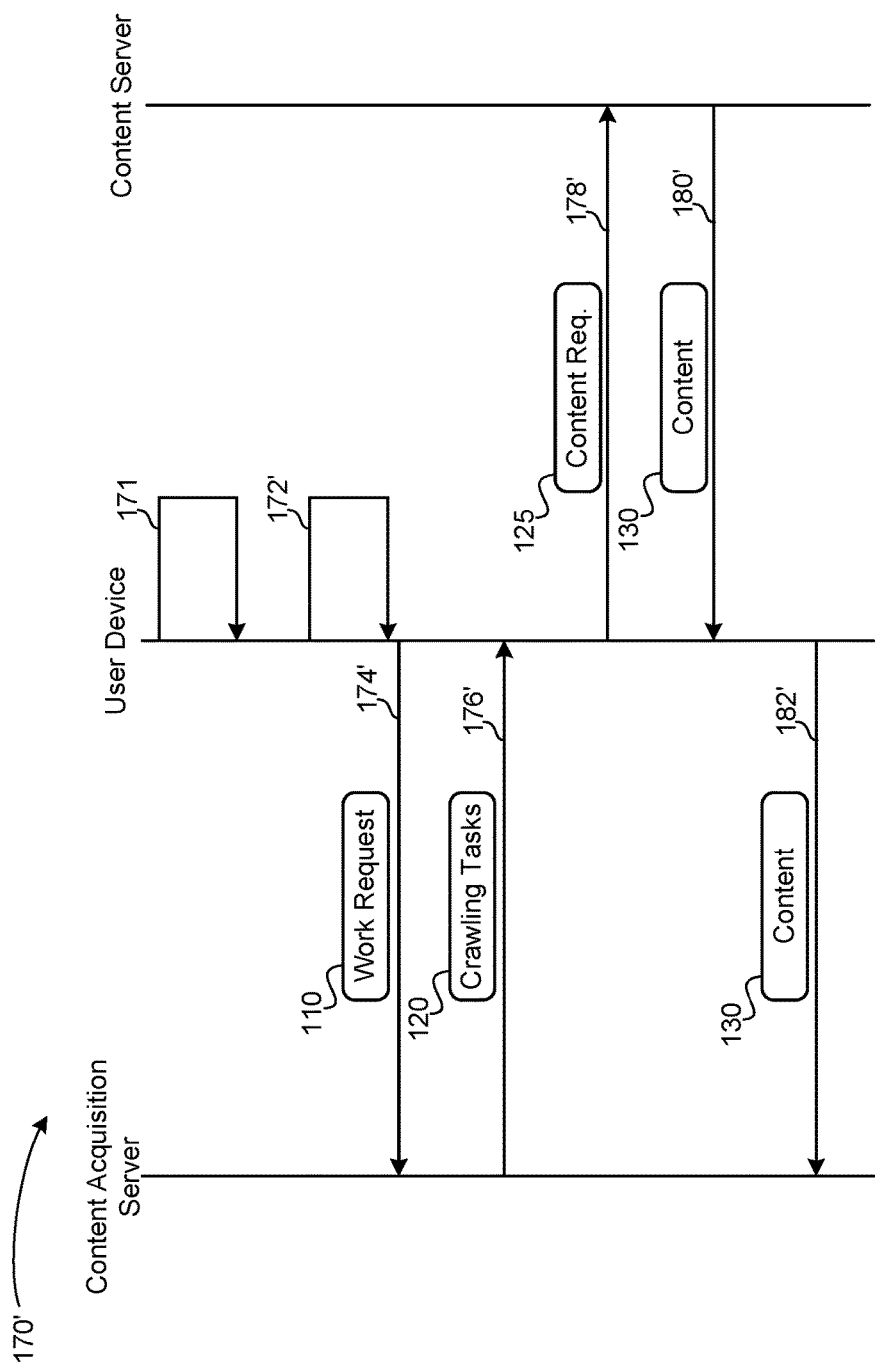
FIG. 1C is another example swim-lane diagram illustrating an example data flow between a content acquisition server, a user device, and a content server.

FIG. 1C is a swim-lane diagram 170' illustrating an example data flow between a content acquisition server 200, a user device 300, and a content server 190. In the example of FIG. 1C, the data flow 170' corresponds to the crowd sourced crawling of a native application. While only one content server 190 is shown, the user device 300 may be in communication with multiple content servers 190. Additionally, the content acquisition server 200 can communicate with multiple user devices 300.

At transition 171, the user device 300 determines a list of native applications installed on the user device 300. The user device 300 may request this information from the operating system of the user device. The operating system may output the list of native applications that are installed on the user device and, for each native application, a version number of the native application.

At transition 172', the user device 300 determines whether its crawling conditions 322 are met. For example, the user device 300 can determine whether it is connected to an external power source, whether it is connected to the network 150 via Wi-Fi or a LAN connection, and whether the display of the user device 300 is off. The crawling conditions may include other suitable conditions such as whether the accelerometer signal indicates that the device 300 is not moving. Furthermore, one or more of the crawling conditions may be application-specific crawling conditions. An application-specific crawling condition may require that a certain application be up-to-date or sufficiently up-to-date. In these implementations, the crawling conditions may indicate a minimum version number or a set of acceptable version numbers. In these implementations, the user device 300 may verify that the version number of a particular native application is greater than a minimum version number or in the set of acceptable version numbers. If so, the native application may be identified in the work request 110.

At transition 174', the user device 300 transmits a work request 110 to the content acquisition server 200. In doing so, the user device 300 may determine a location (e.g., a geolocation) of the user device 300. The user device 300 may include the location as well as the device type and operating system type of the user device 300 in the work request 110. The work request 110 may also include a list of installed native applications in the work request 110. The list of installed native applications may include all the native applications that are installed on the user device or only native applications that met the application-specific crawling conditions.

At transition 176', the content acquisition server 200 transmits the crawling tasks 120 to the user device 300. The content acquisition server 200 can determine the crawling tasks 120 based on the information conveyed in the work request 110, including the list of installed native applications. For instance, the content acquisition server 200 may determine whether there are any tasks that are specific to the list of installed native applications and the device type of the user device 300. If so, the content acquisition server 200 may provide these crawling tasks 120 to the user device 300. These crawling tasks 120 may be application access mechanisms (i.e., Representational State Transfer (REST) request or a Simple Object Access Protocol (SOAP) request access mechanisms configured to access a native application). In some scenarios, the crawling tasks 120 are application resource identifiers, whereby each application resource identifier is configured for a particular native application edition. If a native application is not entirely accessible using application resource identifiers or in other situations, a crawling task 120 may be embodied as a series of commands that replicate user input. These commands cause the user device 300 to launch a native application and to cause the native application to set itself to a particular state. Additionally or alternatively, the crawling tasks 120 can contain other types of access mechanisms.

At transition 178', the user device 300 transmits a content request 125 to a content server 160. In this way, the user device 300 begins performing one of the crawling tasks 120. In the scenario where a crawling task 120 is an application access mechanism, the user device 300 can launch a native application referenced by the application access mechanism. The user device 300 can then set the state of the native application in accordance with the application access mechanism. In setting the state of the native application, the native application will transmit a content request 125 to its associated content server 190.

At transition 180', the user device 300 receives the requested content 130 from the content server 160. The content 130 may be a document represented in HTML, XML, JSON, or any other suitable format. The content 130 may include text, images, videos, and/or layout data defining the location of elements in a graphical user interface of the native application 314. At transition 182', the user device 300 forwards the received content 130 to the content acquisition server 200, as was described above. The content acquisition server 200 may utilize any suitable scraping methods to scraping the content 130.

Figure 2A:
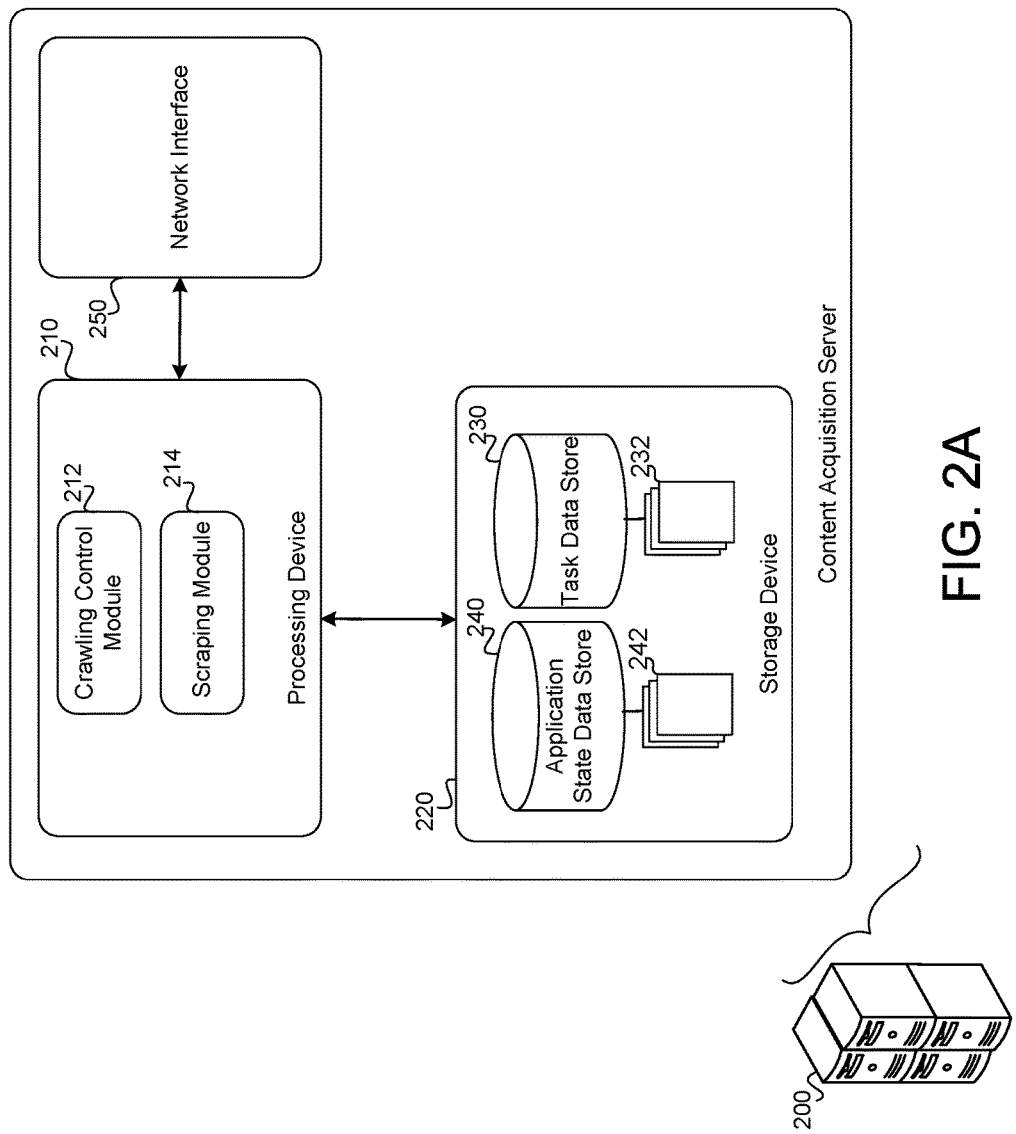
FIG. 2A is a schematic illustrating example components of a content acquisition server.

FIG. 2A illustrates example components of an example content acquisition server 200. In the illustrated example, the content acquisition server 200 includes a processing device 210, a storage device 220, and a network interface 250. The components of the content acquisition server 200 may be interconnected by a bus or any other suitable electronic communication mediums, including a network 150. The content acquisition server 200 may include additional components not explicitly shown in FIG. 2A.

The processing device 210 is a collection of one or more processors that execute computer readable instructions. In implementations having two or more processors, the two or more processors can operate in an individual or distributed manner. In these implementations, the processors may be connected via a bus and/or a network. The processors may be located in the same physical device or may be located in different physical devices. The processing device 210 executes a crawling control module 212 and a scraping module 214.

The network interface 250 includes one or more devices that perform wired or wireless (e.g., Wi-Fi or cellular) communication. Examples of the network interface devices include, but are not limited to, a transceiver configured to perform communications using the IEEE 802.11 wireless standard, an Ethernet port, a wireless transmitter, and a universal serial bus (USB) port.

The storage device 220 includes one or more storage devices. The storage devices may be any suitable type of computer readable mediums, including but not limited to read-only memory, solid state memory devices, hard disk memory devices, and optical disk drives. The storage devices may be connected via a bus and/or a network. Storage devices may be located at the same physical location (e.g., in the same device and/or the same data center) or may be distributed across multiple physical locations (e.g., across multiple data centers). The storage system may include a task data store 230. Further, in some implementations the storage device 220 may store an application state data store 240.

The task data store 230 stores one or more data structures 232 that indicate a set of crawling tasks 120. In some implementations, the data structures 232 are queues that store individual crawling tasks 120. In some of these implementations, the queues are prioritized queues, whereby more important crawling tasks have a higher priority in the queue. For example, if a first website receives millions of hits a day and the content delivered therefrom changes often, crawling tasks 120 associated with the first website are going to have a higher priority in the queue than an old message board that has not been updated in years. In some implementations, the crawling tasks 120 are represented by web resource identifiers (e.g., URLs), application resource identifiers, and/or a series of commands. FIGS. 2B-2E illustrate examples of queues 232.

Figure 2B:
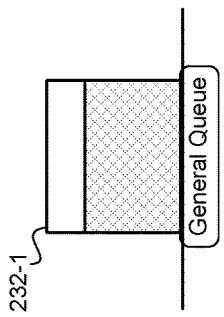
FIG. 2B is a schematic illustrating an example task data store organized in the form of a general queue.

In FIG. 2B, the task data store 230 maintains a general queue 232-1. The general queue stores all types of crawling tasks 120. The general queue 232-1 may be prioritized or may be a standard first-in-first-out queue. In this example, the general purpose queue stores all of the crawling tasks 120 that can be assigned to the collection of user devices 300 that are configured to provide work requests 110 to the content acquisition server 200.

Figure 2C:
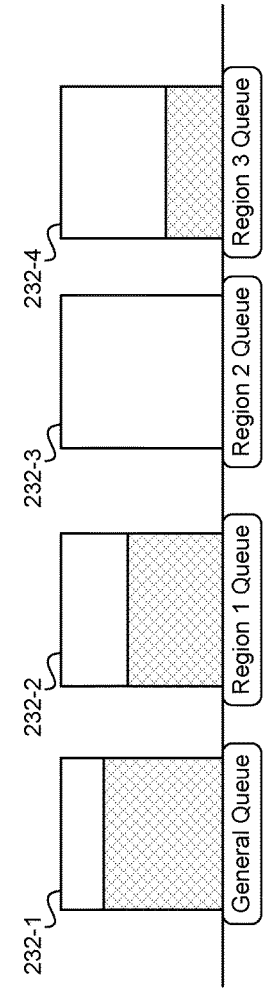
FIG. 2C is a schematic illustrating an example task data store organized in the form of a general queue and several geography-based queues.

In FIG. 2C, the task data store 230 maintains geography-based queues 232-2, 232-3, 232-4. In these implementations, the task data store 230 may further store a general queue 232-1, which stores crawling tasks 120 that are not specific to any geographic area. In the illustrated example, the first geography-based queue 232-2 stores crawling tasks 132 that are specific to a first geographic region. Also, in this example, the second geography-based queue 232-3 corresponds to a second geographic region and does not contain any tasks 120. The third geography-based queue 232-4 corresponds to a third geographic region and contains crawling tasks 120 that are specific to the third geographic region.

Figure 2D:
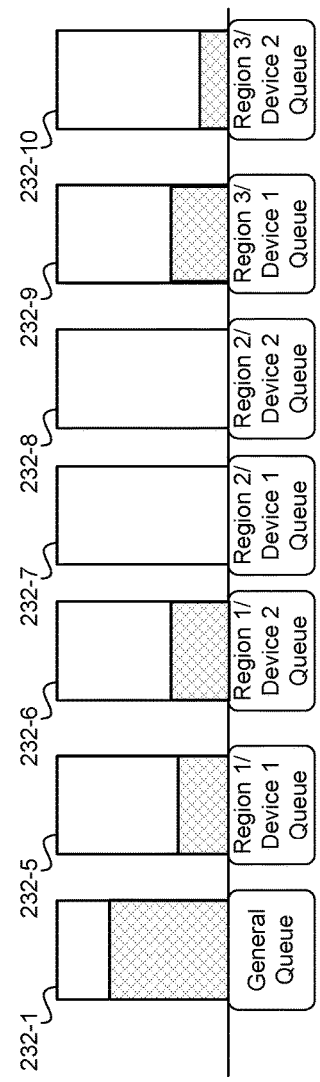
FIG. 2D is a schematic illustrating an example task data store organized in the form of a general queue and several geography- and device-based queues.

FIG. 2D expands on FIG. 2C. In this example, the geography-based queues are further divided into device-based queues 232-5, 232-6, 232-7 . . . 232-10. In this example, the individual queues contain crawling tasks 120 that are specific to a particular device type and geographic region. This may be significant as content providers may decide to alter the content that is provided to a user depending on the location of a requesting user device 300 and the device type (or operating system type) of the user device 300. For example, a first user device 300 of a particular device type may not be able to play videos, while another user device 300 of another device type may have the capability to play all videos, including 3D videos. In this example, the content provider may decide to not provide any content 130 relating to the 3D videos to the first user device 300, where the content provider may provide the movie in 3D to user devices 300 of the second device type. Thus, in this example, a crawling task 120 relating to the 3D movie may be stored in a queue 232 that corresponds to the second device type and not the first device type.

Figure 2E:
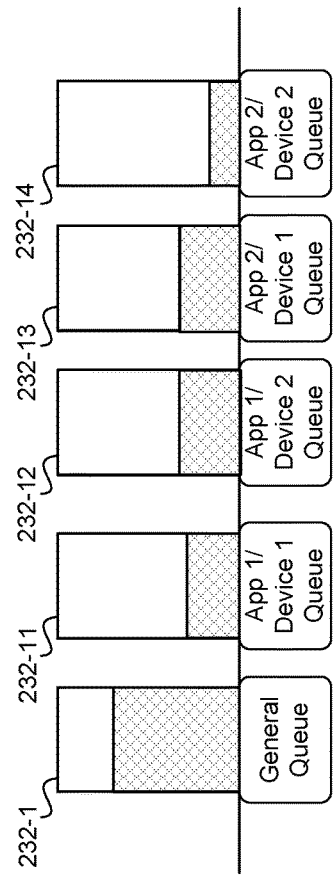
FIG. 2E is a schematic illustrating an example task data store organized in the form of a general queue and several application-based and device-specific queues.

FIG. 2E illustrates application-specific device-based queues 232-11, 232-12, 232-13, 232-14. These queues may be used to crawl native applications. In some implementations, these queues define different device types (e.g., make, model, and operating system), while in some implementations, the queues may merely define different operating system types. Furthermore each of the application-specific device-based queues defines a native application. As native applications are configured for particular platforms (e.g., operating systems), each queue 232 defines crawling tasks 120 that are directed to a particular native application edition that is configured for a particular platform. The crawling tasks 120 in the application-specific device-based queues may include access mechanisms to access native applications. An access mechanism may be an application resource identifier. In some scenarios, however, a native application is not accessible via an application resource identifier. In these scenarios, the access mechanism may include a series of commands (e.g., a series of intents when accessing an application configured for the ANDROID operating system). The series of commands are executed by the user device to obtain content corresponding to a particular state of a software application via the native application. Hence the crawling tasks 120 may be represented by a series of commands or a value indicating the series of commands.

The examples of FIGS. 2B-2E are provided for example only. The queues 232 may be configured in any other suitable manner. Furthermore, while a queue 232 is depicted, any other suitable data structure 232 may be used, such as a stack or a list.

Referring back to FIG. 2A, the crawling control module 212 receives work requests 110 from user devices 300 and determines sets of crawling tasks 120 to provide the user devices 300. In implementations where all the crawling tasks are stored in a general queue 232-1, the crawling control module 212 dequeues one or more crawling tasks 120 from the general queue 232-1 and provides the dequeued crawling tasks 120 to the user device 300. The crawling control module 212 may be configured to provide a predetermined number of crawling tasks 120 to a user device 300 (e.g., ten crawling tasks 120 per work request). In other implementations, the user device 300 can request the number of crawling tasks 120. For example, the user device 300 may be configured to request up to one-hundred crawling tasks 120.

In implementations where the work request 110 contains a geographic location (e.g., a geolocation of the user device 300), the control module 212 can determine a geographic area of the user device 300 based on the geographic location contained in the work request 110. The control module 212 can then determine whether there are any crawling tasks 120 specific to the geographic region of the user device 300 that need to be completed. For example, the control module 212 can check if there are any crawling tasks 120 in a geography-based queue 232 corresponding to the geographic region of the user device 300. If so, the control module 212 can dequeue one or more crawling tasks 120 from the geography-based queue 232. Otherwise, or if the control module 212 empties the geography-based queue 232, the crawling control module 212 can dequeue zero or more crawling tasks 120 from the general queue 232. The control module 212 can transmit the crawling tasks 120 to the user device 300. The scraping module 214 can utilize any suitable crawling strategies, such as focused crawling, batch crawling, incremental crawling, centralized crawling, and/or parallel crawling.

In implementations where the work request 110 contains a device type or operating system type, the control module 212 can determine if there are any crawling tasks 120 that are specific to the device type or operating system type of the user device 300 that transmitted the work request 110. If so, the crawling control module 212 can obtain the crawling tasks 120 and transmit the crawling tasks 120 to the user device 300 that provided the work request 110. In some implementations, the crawling control module 212 checks a queue 232 that is specific to the device type or operating system type of the user device 300. If there are crawling tasks 120 contained in these queues 232, the crawling control module 212 dequeues one or more crawling tasks 120 from the device-based or operating system-based queue 232. Otherwise, or if the control module 212 empties the device-based or operating system-based queue 232, the crawling control module 212 can dequeue zero or more crawling tasks 120 from the general queue 232. The control module 212 can transmit the crawling tasks 120 to the user device 300.

In implementations where the work request 110 contains a list of native applications, the control module 212 can determine if there are any crawling tasks 120 that are specific to any of the native applications indicated in the native application and that can be performed by the user device 300 issuing the work request 110. For each native application indicated in the list of native applications, the control module 212 can determine whether there is an application-specific device-based queue corresponding to device type of the user device. For example, the control module 212 can determine whether there is an application-specific device-based queue 232 corresponding to the operating system type of the user device 300 and/or the make and model of the user device 300. If so, the control module 212 can dequeue a crawling task 120 from the application-specific device-based queue 232. Otherwise, the crawling control module 212 can dequeue one or more crawling tasks 120 from the general queue 232. The control module 212 can transmit the crawling tasks 120 to the user device 300.

The scraping module 214 receives content 130 from a user device 300 in response to providing the crawling tasks 120 to the user device 300. In some implementations, the content 130 is provided in HTML, JSON, or XML code. Additionally, for each crawling task 120 identified in the crawling tasks 120, the content 130 obtained by the user device 300 in response to the crawling task 120 may be associated with the crawling task 120. For instance, if a crawling task is a URL of a particular document, the HTML code, JSON code, or XML code defining the particular document is associated with the URL. In this way, the scraping module 214 can decipher to which crawling task 120 the content 130 corresponds.

The scraping module 214 scrapes the received content 130. In scraping the received content 130, the scraping module 214 identifies keywords and combinations of keywords contained in the underlying document. The scraping module 214 may further identify additional information from the content 130. For instance, the scraping module 214 may identify the geographic region to which the content 130 corresponds, the language of the content, a user device type to which the content 130 corresponds, and/or an operating system type to which the content 130 corresponds. Furthermore, the scraping module 214 may perform entity extraction on the content 130. The scraping module 214 may perform any suitable scraping techniques when scraping the content 130. For instance, the scraping module 214 may perform DOM parsing, HTML parsing, semantic annotation recognition, or any other suitable format.

Figure 2F:
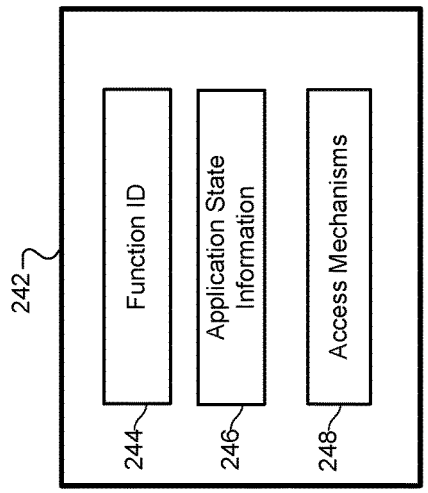
FIG. 2F is a schematic illustrating an example record used to store information related to a state of a software application.

The scraping module 214 can generate and/or update an application state record 242 using the data obtained from scraping received content 130. Application state records 242 are records that describe and/or store information relating to a state of a software application. The application state data store 240 stores the application state records 242. FIG. 2F illustrates an example of an application state record 242. An application state record 242 can correspond to a state of a software application (e.g., a web page) that may be accessed using one or more editions of the software application. In the illustrated an example, an application state record 242 can include a function identifier 244, application state information 246, and one or more access mechanisms 248.

A function ID 244 uniquely identifies an application state record 242 from other application state records 242. The function ID 244 also identifies a state of a software application. A function ID 244 is a string of alphabetic, numeric, and/or symbolic characters (e.g., punctuation marks) that uniquely identifies a state of an application. In some implementations, a function ID 244 can be in the format of a resource identifier. For example, the function ID 244 may be a URL or an application resource identifier. In some implementations, a function ID 244 may have a URL-like structure that utilizes a namespace other than http://, such as "func://" which indicates that the string is a function ID 244. For example, a state of an example software application, "exampleapp" may be accessed using the following URL: www.exampleapp.com/param1=abc¶m2=xyz. According to this example, the function ID 244 corresponding to the example state may be func://exampleapp::param1=abc¶m2=xyz, which may map to the access mechanisms described above. In this example, the function ID 244 can be said to be parameterized, whereby the value of "param1" is set to "abc" and the value of "param2" is set equal to "xyz." In some implementations, a function ID 244 may take the form of a parameterizable function. For instance, a function ID 244 may be in the form of "app id[action(param_1, param_2, . . . parameter_n)]", where app_ id is an identifier (e.g., name) of a software application, action is an action that is performed by the application (e.g., "view menu"), and parameter_1 . . . parameter_n are n parameters that the software application receives in order to access the state corresponding to the action and the parameters. Drawing from the example above, a function ID 244 may be "exampleapp[example action(abc, xyz)]". In this example, the function ID 244 can be said to be parameterized, whereby the value of "param1" is set to "abc" and the value of "param2" is set equal to "xyz." Given this function ID 244 and the referencing schema of the example application, the foregoing function ID 244 may be used to generate or look up the access mechanisms defined above. Furthermore, while function IDs 244 have been described with respect to resource identifiers, a function ID 244 may be used to generate or look up one or more scripts that access a state of a software application or may be utilized to generate one or more scripts that access a state of the software application. Further, a function ID 244 may take any other suitable format. For example, the function ID 244 may be a human-readable string that describes the state of the application to which the function ID 244 corresponds.

The application state information 246 may include data that describes a state of a software application when an edition of the software application is set in accordance with the access mechanism(s) corresponding to the state of the software application. Additionally, or alternatively, the application state information 246 may include data that describes the function performed according to the access mechanism(s) included in the record 242. The application state information 246 may include a variety of different types of data. For example, the application state information 246 may include structured, semi-structured, and/or unstructured data. The scraping module 214 may collect, extract, and/or infer the application state information 246 from the crawled content 130 provided by a user device 300 in response to a crawling task 120. Additionally, the application state information 246 may include manually generated/identified data. Further, the application state information 246 may include data derived from other sources. The scraping module 214 may update the application state information 246 in any application state record 242 so that search results generated using the application state record 242 represents up-to-date information.

In some examples, the application state information 246 may include data that may be presented to the user by a software application when an instance of an edition of the software application is set to the state corresponding to the record 242. In one example, if the record 242 is associated with a shopping application, the application state information 246 may include data that describes products (e.g., names and prices) that are shown when the shopping application is set to the application state defined by the access mechanism 248. Furthermore, the application state information 246 may include visual data that is presented when the state of the software application is accessed (e.g., an image of the product). As another example, if the record 242 is associated with a music player application, the application state information 246 may include data that describes a song (e.g., name and artist) that is played when the music player application is set to the application state defined by the access mechanism. The application state information 246 may further include an image of an album cover or an image of the artist.

The types of data included in the application state information 246 may depend on the type of information associated with the application state and the functionality defined by the access mechanism(s). In one example, if the record 242 is for an application that provides reviews of restaurants, the application state information 246 may include information (e.g., text and numbers) related to a restaurant, such as a category of the restaurant, reviews of the restaurant, and a menu for the restaurant. In this example, the access mechanism 248 may cause the application (e.g., a web or native application) to launch and retrieve information for the restaurant (e.g., using a web browser application or one of the native applications installed on the user device 300). As another example, if the record 242 is for a media-related software application that plays music, the application state information 246 may include information related to a song, such as the name of the song, the artist, lyrics, and listener reviews. In this example, the access mechanism(s) may cause a user device to launch an edition of the software application and play the song described in the application state information 246.

The application state information 246 further defines keywords relating to the document described by the record 242. For instance, the application state information 246 may include any text found in the document (e.g., the text appearing in a web page or at a state of a native application). The application state information 246 may further include entity information, such as entity types that correspond to the state of the application defined by the record 242. The application state information 246 may include individual keywords and n-grams of keywords. The keywords are terms that are found in the text presented by the software application when set to the state defined by the record 242.

The access mechanism(s) 248 define the access mechanisms corresponding to the state of the software application defined by the record 242. The access mechanism(s) can include any access mechanism 248 that can be used to access the state. For example, the access mechanisms 248 can include a web resource identifier, a first application resource identifier used to access the state using a first native application edition, and a second application resource identifier used to access the state using a second native application edition.

In some implementations, the scraping module 214 scrapes the received content 130 and generates/updates application state records 242 based on the scraped content 130. In the event that the scraped content 130 defines newly discovered content, the scraping module 214 can create a new application state record 242 corresponding to the newly discovered content 130. The scraping module 214 can retrieve a template that defines the structure of an application state record 242. The scraping module 214 can then determine a function ID 244 of the scraping module 214. In some implementations, the scraping module 214 can use the resource identifier defined in the crawling task 120 as the function ID 244 (e.g., a URL of the underlying document). In other implementations, the scraping module 214 can generate a unique string or number representing the new application state record 242. In some implementations, the scraping module 214 populates fields in the application state information 246 with the information that was identified from scraping the content 130. For example, the scraping module 252 can populate the application state information 246 with all the keywords and combinations of keywords identified from the content 130. Furthermore, the scraping module 214 can update the application state information 246 with other suitable information, such as entity information, geographic information, device type information, and operating system type information. The scraping module 214 also includes one or more access mechanisms 248 in the application state record 242. The scraping module 214 can include the access mechanism contained in the crawling task 120 in the access mechanisms 248 of the application state record 242. In some scenarios, the content 130 may include additional access mechanisms embedded therein. For instance, if the content 130 is an HTML document that is accessible via a URL, the HTML document may contain tags that indicate alternate access mechanisms, such as one or more application resource identifiers. The scraping module 214 can include any other identified access mechanisms in the application state record 242. Upon generating a new application state record 242, the scraping module 214 can store the new application state record 242 in the application state data store 240.

In the event the content 130 corresponds to a previously crawled state of a software application, the scraping module 214 can obtain an application state record 242 corresponding to the previously crawled state. The scraping module 214 can then update the application state information 246 and/or the access mechanisms 248 stored in the application state record 242 to the extent the content 130 has changed since the most recent crawling of the state of the software application.

The scraping module 214 can update any search indexes that are implicated by newly identified content 130. For instance, if the scraping module 214 crawls and scrapes a new state of a software application, the scraping module 214 can update one or more search indexes using the keywords identified in the software application while scraping the newly identified content 130 (i.e., content 130 identified in response to a crawling task 120 of a previously unidentified state of a software application). Similarly, if the scraping module 214 updates an application state record 242, the scraping module 214 may update the search index to identify any new content 130 contained in the previously scraped state of the software application. For example, if a keyword is used more often in a recent update of a document, the scraping module 214 can update the term-frequency inverse domain frequency value (TF-IDF) of the keyword in the search index as it pertains to the document. Similarly, if the recent update contains a new keyword, then the scraping module 214 can update the search index to include the new keyword. The scraping module 214 can calculate the TF-IDF value of the new keyword and can modify the index to reflect the TF-IDF value.

Furthermore, as the scraping module 214 scrapes the content 130, the scraping module 214 may identify links to other states of software applications in the content 130. In these scenarios, the scraping module 214 can, for example, add URLs indicated by the links to the crawling tasks 120 that are to be performed. For instance, the scraping module 214 can enqueue a URL or application resource identifier into a queue 232.

Upon completing the crawling/scraping of received content 130 (e.g., a received document), the scraping module 214 may issue a reward for the user of the user device 300 that performed the crawling task 120 that obtained the received content 130. For example, the scraping module 214 may issue a credit to the account of a user or an account of a charity selected by the user. Alternatively, the scraping module 214 may submit an entry in a drawing on behalf of the user.

The system described with respect to FIGS. 2A-2F are provided for example. Variations of the system are within the scope of the disclosure. For instance, the crawling tasks 120 may include alternative types of tasks including crawling of native applications ("application crawling").

Figure 3:
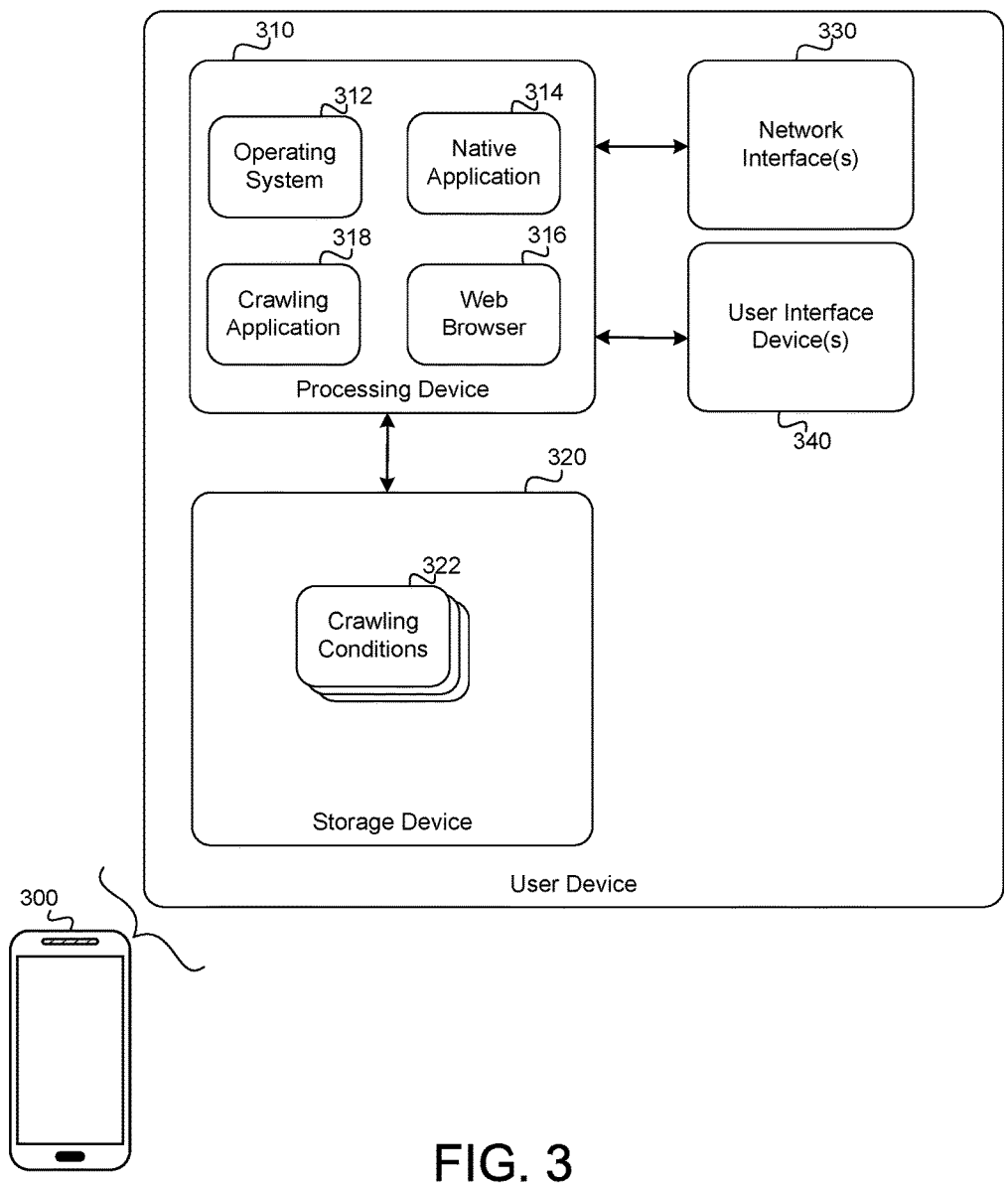
FIG. 3 is a schematic illustrating example components of a user device.

FIG. 3 illustrates an example of a user device 300 that is configured to perform crawling tasks 120 on behalf of a content acquisition server 200. An example user device 300 may include, but is not limited to, a processing device 310, a storage device 320, a network interface 330, and a user interface 340. The components of the user device 300 may be interconnected by, for example, a bus. The user device 300 may include other components not shown, such as an accelerometer, a GPS unit, and/or a camera.

The processing device 310 can include one or more processors that execute computer-executable instructions and associated memory (e.g., RAM and/or ROM) that stores the computer-executable instructions. In implementations where the processing device 310 includes more than one processor, the processors can execute in a distributed or individual manner. The processing device 310 can execute an operating system 312 of the user device 300, one or more native applications 314, a web browser 316, and a crawling application 318.

The storage device 320 can include one or more computer-readable mediums (e.g., hard disk drive or flash memory drive). The storage device 320 can be in communication with the processing device 310, such that the processing device 310 can retrieve any needed data therefrom. The storage device 320 stores a set of crawling conditions 322, which are described in greater detail below.

The network interface 330 includes one or more devices that are configured to communicate with the network 150. The network interface 330 can include one or more transceivers for performing wired or wireless communication. Examples of the network interface 330 can include, but are not limited to, a transceiver configured to perform communications using the IEEE 802.11 wireless standard, an Ethernet port, a wireless transmitter, and a universal serial bus (USB) port.

The user interface 340 includes one or more devices that receive input from and/or provide output to a user. The user interface 340 can include, but is not limited to, a touchscreen, a display, a QWERTY keyboard, a numeric keypad, a touchpad, a microphone, and/or speakers.

In some implementations, the crawling application 318 is a native application or a module that is part of a larger native application that obtains content 130 from content servers 190 on behalf of a content acquisition server 200 and in response to a set of crawling tasks 120. In some implementations, a user of the user device 300 agrees to allow his or her user device 300 collect content 130 on behalf of the content acquisition server 200 in exchange for a reward. Examples of rewards can include awarding a charitable donation to a charity of the user's choosing each time the user device 300 performs a crawling task 120, crediting a user with a small payment each time the user device 300 performs a crawling task 120, or submitting an entry on behalf of the user for a prize each time the user device 300 performs a crawling task 120.

In some implementations, the crawling application 318 monitors the user device 300 to determine if a set of crawling conditions 322 have been met. A crawling condition 322 can refer to a rule that must be satisfied in order for the crawling operation to be performed. The crawling conditions 322 of a user device 300 may be default conditions that are provided by the content acquisition server 200. Additionally or alternatively, the user device 300 may allow the user to configure the crawling conditions 322. Meeting the crawling conditions 322 signifies to the crawling application 318 that the user is not currently using the user device 300. Furthermore, the crawling conditions 322 may be set so as to minimize the stress on resources typically associated with using a mobile user device 300. For example, ensuring that the user device 300 is plugged in and connected to a Wi-Fi connection ensures that performance of the crawling tasks 120 does not drain the battery of the user device 300 and does not use up mobile data, which may be limited to a certain allotment every month. Other examples of crawling conditions 322 may include a timing condition (e.g., only perform crawling tasks 120 between 1:00 AM and 5:00 AM) and an accelerometer condition (e.g., only when the user device 300 is not moving or moving above a certain speed, thereby implying that the user is in a car).

In some implementations, the crawling application 318 is configured to crawl native applications. In these implementations, the crawling conditions may include application-specific crawling conditions. An application-specific crawling condition is a condition that must be met in order for a particular native application to be included in the list of installed native applications that are transmitted to the content acquisition server 200 in a work request 110. For example, in order to crawl a particular native application, the crawling conditions may require that the particular native application is the most recent version of the native application, or a recent version of the native application. Thus, the application-specific crawling conditions for a particular application edition may define a minimum version number of the native application or a set of allowable version numbers.

When the crawling application 318 determines that the crawling conditions 322 have been met, the crawling application 318 generates a work request 110. In some implementations, a work request 110 can indicate to the content acquisition server 200 that the crawling conditions 322 have been met and the crawling application 318 is ready to perform crawling tasks. Additionally, the work request 110 can include additional data, such a geolocation of the user device 300, the operating system type of the user device 300, and/or a device type of the user device 300. The crawling application 318 can obtain a geolocation of the user device 300 from, for example, a GPS unit of the user device 300. The crawling application 318 may store the operating system type and device type in its application data (which may be stored in the storage device 320), such that the crawling application 318 can obtain this information each time it generates a work request 110. If the operating system is updated, the crawling application 318 can update its application data to reflect the new operating system version. The crawling application 318 transmits the work request 110 to the content acquisition server 200 via the network 150.

In implementations where the crawling application 318 crawls native applications, the work request 120 may include a list of installed native applications. The list of installed native applications can indicate the native applications that are installed on the user device 300. Furthermore, in some implementations, the crawling application 318 can exclude native applications in the list of installed native applications that have not met their respective application-specific crawling conditions. For example, the crawling application 318 may exclude native applications that are not adequately up to date (e.g., native applications that do not have a version number greater than a minimum edition number). The crawling application 318 can obtain the list of the installed native applications from the operating system 312. The operating system 312 can return the list of installed native applications and the version number of each native application. It is noted that the list of installed native applications may be a list of application identifiers, whereby each application identifier is a value that respectively identifies a corresponding native application. In implementations where the crawling application 318 crawls native applications, the work request 120 may further include a device type, an operating system type, a screen resolution of the user device, and/or a geographic location or region of the user device.

In response to transmitting the work request 110 to the content acquisition server 200, the crawling application 318 receives a set of crawling tasks 120 from the content acquisition server 200. The set of crawling tasks 120 can include one or more crawling tasks 120. In some implementations, each crawling task 120 is represented by an access mechanism. For example, a crawling task 120 may be a resource identifier, such as a URL. The access mechanism indicates the document (e.g., a state of a software application) that is to be retrieved. In response to a crawling task 120, the crawling application 318 obtains the content 130 indicated by the crawling task 120. In some implementations, the crawling application 318 may issue a content request 125 to a content server 190 indicated by the access mechanism. In some of these implementations, the content request 125 is an HTTP request to a content server 190, whereby the HTTP request is transmitted to a location indicated by the resource identifier. The content request 125 may, however, be other suitable requests (e.g., SOAP requests). The crawling application 318 transmits content requests 125 for each crawling task 120 contained in the set of crawling tasks 120. In some implementations, the crawling application 318 may utilize the web browser 316 to transmit the content requests 125, whereby the web browser 316 transmits the content request 125 on behalf of the crawling application 318.

In response to a content request 125, a content server 190 returns content 130 if the access mechanism defined in the corresponding crawling task 120 is valid and identifies an actual content server 190. The crawling application 318 receives the content 130 from the content server 190 and associates the received content 130 with a corresponding crawling task 120. In some implementations, the content 130 represents a document (e.g., webpage or other state of a software application) and is encoded in HTML code or XML code and received via HTTP or HTTPS. Once the crawling application 318 has received content 130 corresponding to each of the crawling tasks 120 (or indicating that the content 130 corresponding to a particular crawling task is unavailable) the crawling application 318 transmits the received content 130 to the content acquisition server 200. The crawling application 318 may return each instance of content 130 (e.g., each document) associated with the crawling task 120 that implicated the instance of the content 130. For example, the crawling application 318 may bundle HTML code representing a document and a URL corresponding to the document and may return the bundled HTML code and URL to the content acquisition server 200.

While the crawling application 318 has been described with respect to HTML documents requested over HTTP, the crawling application 318 may access additional or alternative types of data. In some implementations, some crawling tasks 120 are directed to crawling a native application. In these implementations, the crawling tasks 120 can include an application resource identifier or a series of commands that access a state of a native application. The crawling application 318 identifies a native application edition of a software application based on a crawling task 120 and issues a content request 125 via an instance of the native application edition installed on the user device 300. The crawling application 318 receives the content 130 from the content server 190 via the native application 314.

In some scenarios, the crawling task 120 indicates an application resource identifier. For example, the following may be an application resource identifier to reach a particular state of the TRIPADVISOR native application for the ANDROID operating system: "tripadvisor:///Restaurant-_Review-g56980-d622233-Reviews-The_Cafe_at_Excursions_of_Escalante-Escalante_Utah.htm." In response to such a crawling task 120, the crawling application 318 can launch the native application indicated by the application resource identifier and set the state of the native application to the state indicated by the application resource identifier. For instance, the crawling application 318 may issue a request to the operating system 312 to launch the TRIPADVISOR native application. The crawling application 318 can then pass the application resource identifier to the TRIPADVISOR native application 314. In setting the state, the native application 314 issues the content request 125 to its respective content server 190 (e.g., the application server serving the native application). For example, the native application may issue a REST request or a SOAP request. In response to the content request 125, the native application 314 receives content 130 from the content server 190. In some scenarios, the crawling application 318 may receive, for example, a JSON response containing the content. The crawling application 318 obtains the content 130 from the native application 314 and transmits the content 130 to the content acquisition server 200 in the manner described above. In some implementations, the crawling application 318 fetches the content 130 from the native application 314 or by listening to the incoming network traffic to the user device 300.

In some scenarios, the crawling task 120 is a series of commands. For example, the series of commands may be embodied in a series of Android Intents when the crawling task 120 is directed to crawling a native application configured for the ANDROID operating system. In these scenarios, the series of commands include a command to launch a particular application 314. Appendix A illustrates an example of a crawling task 120 that includes a series of commands. In the example of Appendix A, the crawling task 120 that is transmitted may be different than the representation of the crawling task 120 in the respective task queue 232. For instance, the crawling task 120 that is stored in a task queue 232 may be a pointer to a file that stores the series of commands identified in Appendix A. In response to a series of commands the, crawling application 318 can issue a request to the operating system 312 to launch the particular native application 314 identified in the crawling task 132. Upon receiving confirmation that the operating system has launched the particular native application 314, the crawling application 318 can issue a series of more commands, whereby the commands are configured to replicate operations that the native application 314 would issue in response to a user using the native application to access a particular state. In issuing the series of commands, the native application 314 will set its state to a state indicated by the crawling task. In setting the state, the native application 314 may request content from the content server 190. Thus, the series of commands identified in the crawling task cause the native application 314 to issue a content request 125 to the content server 190. For example, the native application may issue a REST request or SOAP request. In response to the content request 125, the native application 314 receives content 130 from the content server 190. In some scenarios, the crawling application may receive, for example, a JSON or XML response containing the content. The crawling application 318 obtains the content 130 from the native application 314 and transmits the content 130 to the content acquisition server 200 in the manner described above. Appendix B illustrates an example of content 130 that the crawling application 318 may return in response to the crawling task 130 defined in Appendix A. The crawling application 318 may return content at the completion of each crawling task 120. Alternatively, the crawling application 318 may return the content at completion of all crawling tasks 120 assigned to the crawling application 218.

The user device 300 described with respect to FIG. 3 is provided for example. Variations of the user device 300 and the crawling application 318 are within the scope of the disclosure. For instance, the crawling application 318 may be configured to perform additional or alternate crawling tasks 120, such as crawling of native applications ("application crawling").

Figure 4:
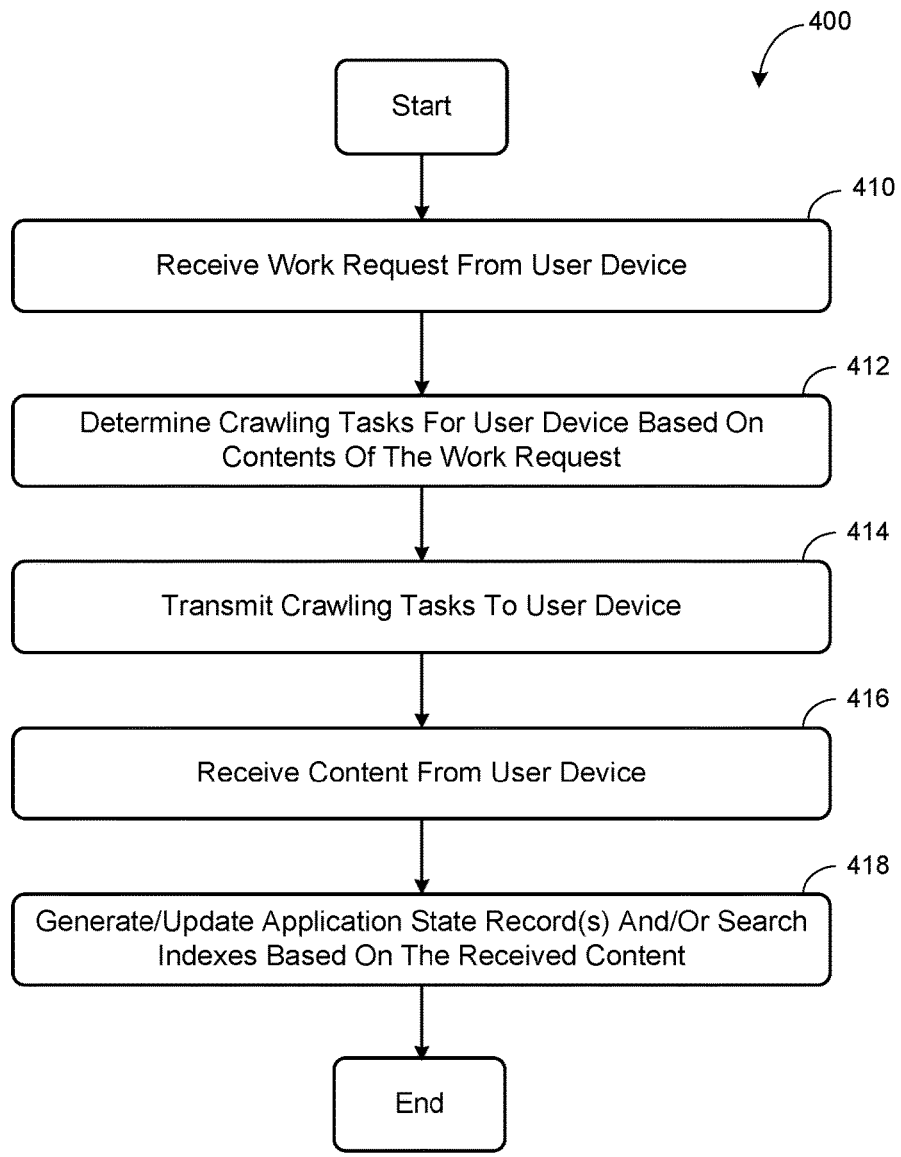
FIG. 4 is a flow chart illustrating an example set of operations for acquiring content.

FIG. 4 illustrates an example set of operations for a method 400 for acquiring content 130 using a user device 300. The method 400 is described with respect to the components of the content acquisition server 200. The method 400, however, may be executed by any other suitable computing device.

At 410, the crawling control module 212 receives a work request 110 from a user device 300. The work request 110 indicates that the user device 300 is in a condition where it can perform crawling tasks 120 on behalf of the content acquisition server 200. Put another way, the user device 300 informs the crawling control module 212 when it can receive crawling tasks 120. In this way, the crawling control module 212 does not need to monitor and maintain the workloads of a set of distributed dedicated proxy computing devices. In some implementations, the crawling request 110 may further include a list of installed native applications. The list of installed native applications indicate the native applications that are currently installed on the user device 300 that issued the work request 110.

At 412, the crawling control module 212 determines a set of crawling tasks 120 to provide to the user device 300 based on the work request 110. In some implementations, the crawling control module 212 identifies the set of crawling tasks 120 from one or more data structures 232 (e.g., queues) that store crawling tasks 120. As previously discussed, the crawling control module 212 may be configured to maintain a general queue. In these implementations, the crawling control module 212 may dequeue one or more crawling tasks 120 therefrom. In other implementations, the crawling control module 212 may be configured to additionally maintain geography-based, device-based, and/or operating system-based queues, whereby the queue defines crawling tasks that are geographic specific and/or specific to certain types of devices or operating systems. In these implementations, the crawling control module 212 can identify the geographic region corresponding to the user device 300 that provided the request, the device type of the user device 300, and/or the operating system type of the user device 300. In these implementations, the crawling control module 212 may be configured to dequeue crawling tasks from the geography-based, device-based, and/or operating system-based queues that correspond to the information conveyed in the work request 110 before trying to dequeue crawling tasks 120 from the general queue. In some implementations, the user device 300 is configured to provide crawling tasks 120 directed to crawling native applications. In these implementations, the control module 212 queries the application-specific device-based queues with the native applications indicated in the list of installed native applications and the device type of the user device 300 (e.g., operating system and/or make and model). To the extent there are crawling tasks 120 defined in an application-specific device-based queue corresponding to the work request 110, the control module 212 can include crawling tasks 120 therefrom. Otherwise, the control module 212 can obtain crawling tasks from the general queue. At 414, the crawling control module 212 transmits the set of crawling tasks 120 to the user device 300.

At 416, the scraping module 214 receives content 130 from the user device 300 that provided the work request 110. The content 130 may include, for example, HTML, JSON, or XML code and may represent a document. The HTML, JSON, or XML code may be associated with the crawling task 120 that implicated the document. At 418, the scraping module 214 generates/updates one or more application state records 242 and/or one or more search indexes based on the received content 130. The scraping module 214 may utilize any suitable scraping technique, such as DOM parsing, HTML parsing, semantic annotation recognition, or any other suitable format, to identify the data with which to update the application state records and/or the search index (es). In the event that the content 130 corresponds to newly discovered content (e.g., a previously uncrawled state of a software application), the scraping module 214 may create a new application state record 242 and may populate the record 242 with information contained in the content 130. If the content 130 corresponds to a previously crawled state of a software application, the scraping module 214 may update the application state record 242. Additionally or alternatively, the scraping module 214 may maintain and update one or more search indexes (e.g., inverted indexes) based on the received content 130. As previously discussed, the search indexes may include the access mechanisms that can be used to access the state of the software application corresponding to the received content 130. Updating a search index may include adding a keyword to the search index if the keyword is not previously found. Additionally or alternatively, updating a search index may include adding one or more access mechanisms in relation to a keyword in the index, when the keyword is found in the scraped content 130. In some implementations, the scraping module 214 may recalculate a score of the keyword with respect to a document based on the scraped content 130 representing the document. For instance, the scraping module 214 may recalculate the TF-IDF score of the keyword as it relates to the document. The scraping module 214 stores the newly created or updated records in the application state data store 240.

The method 400 of FIG. 4 is provided for example and not intended to limit the scope of the disclosure. Furthermore, the method 400 of FIG. 4 defines the process of processing a work request. The method 400 may execute iteratively and/or in parallel to handle other work requests received from the user device 300 or from other user devices 300. Variations and alternation of the method are within the scope of the disclosure.

Figure 5:
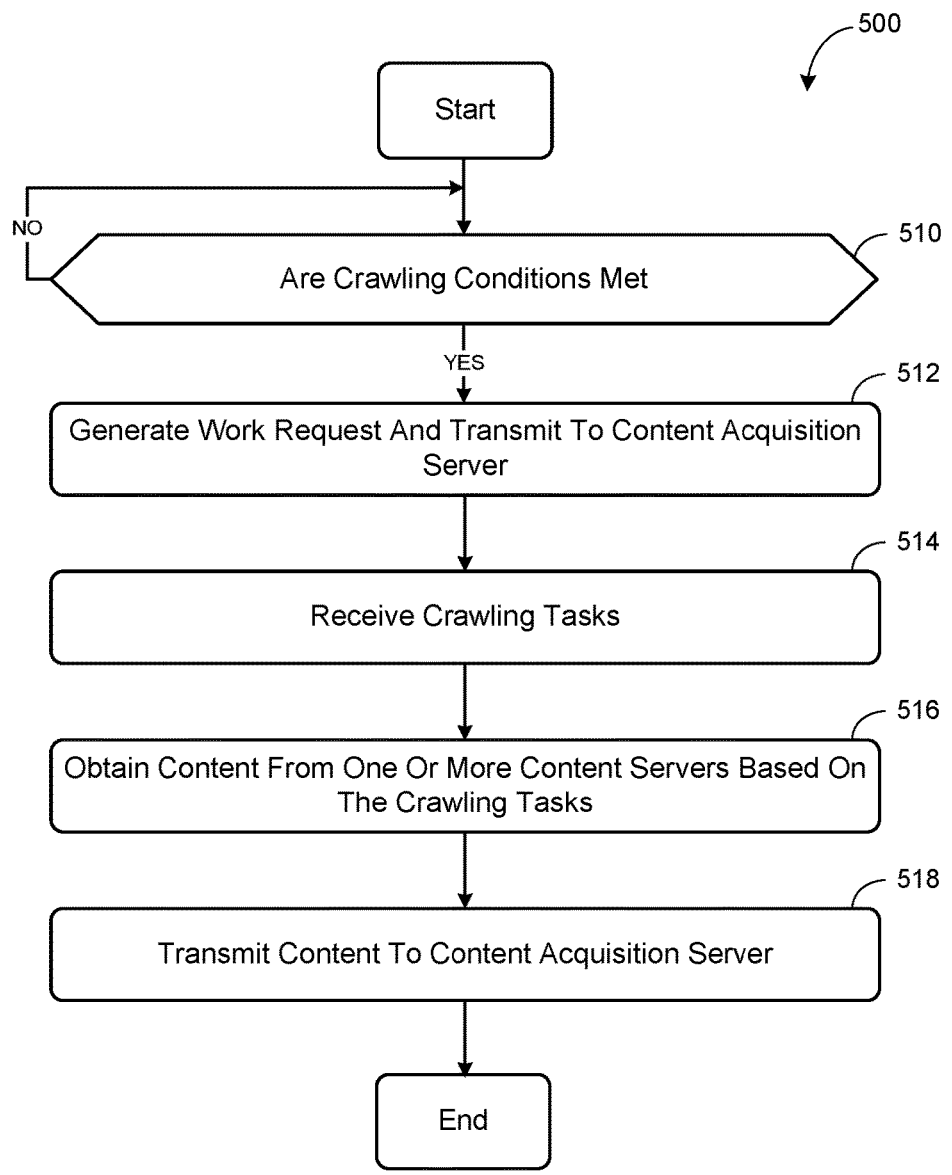
FIG. 5 is a flow chart illustrating an example set of operations for receiving and performing crawling tasks at a user device.

FIG. 5 illustrates an example set of operations for a method 500 for performing crawling tasks 120. The method 500 may be performed by a crawling application 318 being executed by a user device 300. The method 500, however, may be performed by any other suitable application being executed by a user device 300.

At 510, the crawling application 318 monitors one or more conditions of the user device 300 to determine whether a set of crawling conditions 322 are met. As previously discussed, the crawling conditions 322 can be set as a set of default conditions or can be configurable by a user. The crawling conditions 322 can indicate conditions that tend to suggest that the user device 300 is ready to perform crawling tasks 120. Examples of crawling conditions can include, but are not limited to, whether the user device 300 is plugged into a power source, whether the user device 300 is connected to Wi-Fi or a LAN connection, whether the display of the user device 300 is blank, and/or whether the user device 300 is moving.

When the crawling application 318 determines that the crawling conditions 322 are met, the crawling application 318 generates a work request 110 and transmits the work request 110 to the content acquisition server, as shown at 512. The work request 110 can include additional information such as geographic location, device type, and operating system type. At 514, the crawling application 318 receives the crawling tasks 120 from the content acquisition server 200. The crawling tasks 120 can include one or more access mechanisms, each access mechanism indicating a different crawling task 120. At 516, the crawling application 318 obtains content 130 from one or more content servers 190. For example, the crawling application 318 may send content requests 125 to the content server 160 (e.g., HTTP requests to a web server). At 518, the crawling application 318 receives the requested content 130 and forwards it to the content acquisition server 200. In this way, the crawling application 318 has completed the crawling task assigned by the content acquisition server 200.

The method 500 of FIG. 5 is provided for example and not intended to limit the scope of the disclosure. Furthermore, the crawling application may execute the method 500 of FIG. 5 iteratively until the crawling conditions are no longer met and/or may execute in a parallel. Variations of the methods 400, 500 are contemplated and are within the scope of the disclosure.

Figure 6:
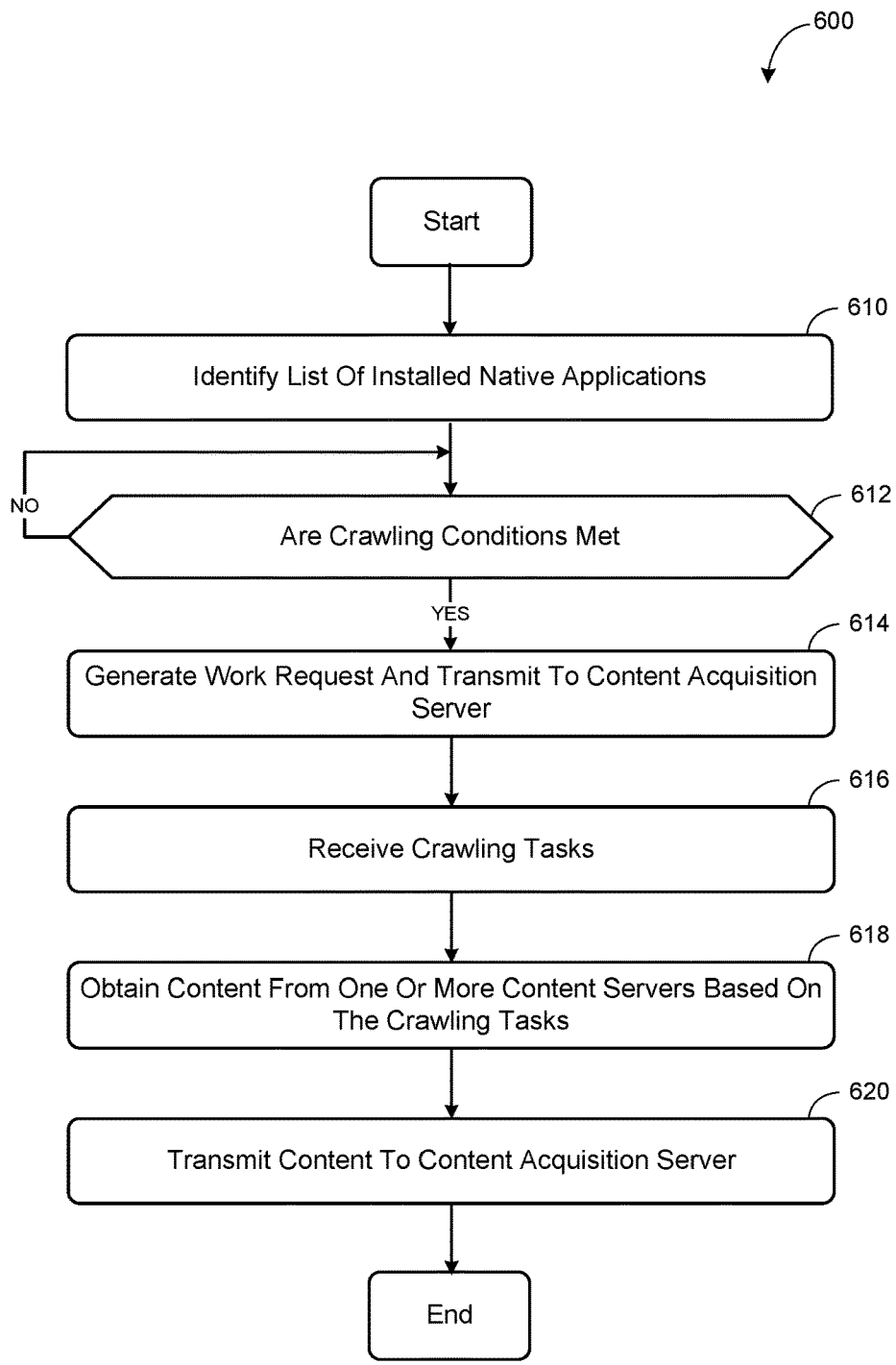
FIG. 6 is a flow chart illustrating an example set of operations for performing crawling tasks directed to native applications.

FIG. 6 illustrates an example set of operations for a method 600 for performing crawling tasks 120 directed to native applications. The method 600 may be performed by a crawling application 318 being executed by a user device 300. The method 500, however, may be performed by any other suitable application being executed by a user device 300. Furthermore, in some implementations, the crawling application 318 may be executed at least in part by an external computing device connected to the user device 300, whereby the crawling application 318 may include a master and a slave component at the remote device and user device respectively.

At 610, the crawling application 318 obtains a list of installed native applications. The crawling application 318 can request the list of installed native applications from the operating system 312 of the user device 300. The operating system 312 may output a list of installed native applications, and in some implementations, a version number of each native application.

At 612, the crawling application 318 monitors one or more conditions of the user device 300 and/or applications installed thereon to determine whether a set of crawling conditions 322 are met. As previously discussed, the crawling conditions 322 can be set as a set of default conditions or can be configurable by a user. The crawling conditions 322 can indicate conditions that tend to suggest that the user device 300 is ready to perform crawling tasks 120. Examples of crawling conditions can include, but are not limited to, whether the user device 300 is plugged into a power source, whether the user device 300 is connected to Wi-Fi or a LAN connection, whether the display of the user device 300 is blank, and/or whether the user device 300 is moving. Furthermore, in some implementations, the crawling application 318 determines if one or more application-specific crawling conditions are met. Application-specific crawling conditions can refer to conditions that an installed native application needs to meet in order to be crawlable by the crawling application 318. An example of an application-specific crawling condition may relate to the version number of the native application. For example, an application-specific crawling condition may require the version number of the installed native application be greater than a minimum version number. Additionally or alternatively, an application-specific crawling condition may require the version number of the installed native application to be in a set of acceptable version numbers. If the application-specific crawling condition is met, the installed native application is included in the list of installed native applications that is provided in the work request 110. Other application-specific crawling conditions can include conditions relating to user consent. In some implementations the user may explicitly define the applications that he or she consents to allowing the crawling application 318 to crawl. In this way, the crawling application 318 only includes a native application in the list of installed native applications have been explicitly consented to by the user.

When the crawling application 318 determines that the crawling conditions 322 are met, the crawling application 318 generates a work request 110 and transmits the work request 110 to the content acquisition server, as shown at 614. The work request 110 can include additional information such as geographic location, device type, operating system type, and the list of installed native applications. At 616, the crawling application 318 receives the crawling tasks 120 from the content acquisition server 200. The crawling tasks 120 can include one or more access mechanisms, each access mechanism indicating a different crawling task 120. The crawling tasks 120 can include one or more application access mechanisms. In these scenarios, the crawling tasks 120 include tasks directed at crawling native applications.

At 618, the crawling application 318 obtains content 130 from one or more content servers 190. In some scenarios, the crawling task 120 indicates an application resource identifier. In response to such a crawling application 120, the crawling application 318 can launch the native application indicated by the application resource identifier and set the state of the native application to the state indicated by the application resource identifier. In other scenarios, the crawling task 120 is a series of commands. In these scenarios, the crawling application 318 can issue a request to the operating system 312 to launch a native application 314 indicated in the series of commands and can issue a series of additional commands to access a particular state of the native application. In either scenario, the native application 314 sets its state and, in setting its state, the native application 314 issues the content request 125 to its respective content server 190 (e.g., the application server serving the native application). For example, the native application may issue a REST request or a SOAP request. In response to the content request 125, the native application 314 receives content 130 from the content server 190. In some scenarios, the crawling application may receive, for example, a JSON or XML response containing the content 130. At 620, the crawling application 318 transmits the content 130 to the content acquisition server 200 in the manner described above.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

APPENDIX A

Example 1:
```
{
  "packageName":"com.ted.android",
 "component":"com.ted.android.view.activity.SearchActivity",
  "SeatchQuery":"math",
  "action":"android.intent.action.SEARCH",
  "OS":"android",
  "appId":3382839228727947OO,
  "editionId":5213119407595036000,
}
```

Example 2:
```
{
 "accessUrl": {
   "packageName": "com.ted.android",
   "component": "com.ted.android.view.activity.SearchActivity",
   "extra": [
     {
       "type": "java.lang.String",
       "value": "math",
       "key": "query"
     }
   ],
   "action": "android.intent.action.SEARCH",
   "editions": [
     {
       "platform": "android",
       "appId": 3382839228727947OO,
```

```
      "editionId": 5213119407595036000,

"maxVersion": "5030101",
      "minVersion": "5030101"
    }
  ],
  "jar": "StandardJSONIntent.jar",
  "method": "launchIntentViaJSON",
  "capture-intents": "true"
},
"guide": {
  "component-name": "com.ted.android.view.activity.SplashScreenActivity",
  "packageName": "com.ted.android",
  "activities": [
    {
      "activity": "com.ted.android.view.activity.SearchActivity",
      "action": [
        {
          "name": "click",
          "widgetClass": "android.widget.LinearLayout",
          "parentViewID": "com.ted.android:id/resultsView",
          "widgetID": "com.ted.android:id/talkItem",
          "parentViewType": "android.widget.ListView",
          "value": "",
          "targetState": "com.ted.android.view.activity.TalkDetailActivity",
          "action": "click",
          "listitem_leafnodes": [
            {
              "className": "android.widget.ImageView",
              "widgetID": "com.ted.android:id/thumbnail"
            },
```

```
            {
              "className": "android.widget.CheckedTextView",
              "widgetID": "com.ted.android:id/title"
            }
          ],
          "hierarchy": [
            {
              "className": "android.widget.ListView",
              "widgetID": "com.ted.android:id/resultsView"
            }
          ]
        }
      ]
    }
  ]
}
```

APPENDIX B

```
{
  "status": true,
  "data": {
    "screen_dump": {
      "result": true,
      "trigger": {
        "intent_data": "intent_data_not_available",
        "resources": [
          {
            "resource_id": 16908890,
            "view_name": "android.widget.ImageView",
            "image_location": "{\"img_location\":\"\/mnt\/sdcard\/contentscraper\/images\/up_1450253480712.jpeg\"}",
            "view_id": "android:id/up",
            "is_actionable": false,
            "entity": null
          },
          {
            "resource_id": 16908332,
            "view_name": "android.widget.ImageView",
            "image_location": "{\"img_location\":\"\/mnt\/sdcard\/contentscraper\/images\/home_1450253481154.jpeg\"}",
            "view_id": "android:id/home",
            "is_actionable": false,
            "entity": null
          },
          {
            "view_name": "android.widget.TextView",
            "is_actionable": false,
            "view_text": "Search",
```

```
      "entity": null
    },
    {
      "resource_id": 2131624228,
      "view_name": "android.widget.TextView",
      "is_long_clickable": true,
      "is_clickable": true,
      "is_actionable": true,
      "entity": null,
      "view_id": "com.ted.android:id/menu_search",
      "view_text": "Search"
    },
    {
      "view_name": "android.widget.ImageButton",
      "image_location":
"{\"img_location\":\"\/mnt\/sdcard\/contentscraper\/images\/view_1450253481388.jpeg\"}",
      "is_clickable": true,
      "is_actionable": true,
      "entity": null
    },
    {
      "resource_id": 2131624042,
      "view_name": "android.widget.ImageView",
      "image_location":
"{\"img_location\":\"\/mnt\/sdcard\/contentscraper\/images\/thumbnail_1450254558060.jpeg\
"}",
      "view_id": "com.ted.android:id/thumbnail",
      "is_actionable": false,
      "entity": null
    },
    {
```

```
        "resource_id": 2131623988,
        "view_name": "android.widget.CheckedTextView",
        "is_checked": false,
        "is_checkable": true,
        "is_actionable": true,
        "entity": null,
        "view_id": "com.ted.android:id/title",
        "view_text": "Arthur Benjamin: A performance of \"Mathemagic\""
      },
      {
        "resource_id": 2131624042,
        "view_name": "android.widget.ImageView",
        "image_location":
"{\"img_location\":\"\/mnt\/sdcard\/contentscraper\/images\/thumbnail_1450254558067.jpeg\"}",
        "view_id": "com.ted.android:id/thumbnail",
        "is_actionable": false,
        "entity": null
      },
      {
        "resource_id": 2131623988,
        "view_name": "android.widget.CheckedTextView",
        "is_checked": false,
        "is_checkable": true,
        "is_actionable": true,
        "entity": null,
        "view_id": "com.ted.android:id/title",
        "view_text": "Robert Lang: The math and magic of origami"
      },
      {
        "resource_id": 2131624042,
```

```
"view_name": "android.widget.ImageView",
"image_location":
"{\"img_location\":\"\/mnt\/sdcard\/contentscraper\/images\/thumbnail_1450254558076.jpeg\
"}",
"view_id": "com.ted.android:id/thumbnail",
"is_actionable": false,
"entity": null
},
{
"resource_id": 2131623988,
"view_name": "android.widget.CheckedTextView",
"is_checked": false,
"is_checkable": true,
"is_actionable": true,
"entity": null,
"view_id": "com.ted.android:id/title",
"view_text": "Margaret Wertheim: The beautiful math of coral"
},
{
"resource_id": 2131624042,
"view_name": "android.widget.ImageView",
"image_location":
"{\"img_location\":\"\/mnt\/sdcard\/contentscraper\/images\/thumbnail_1450254558083.jpeg\
"}",
"view_id": "com.ted.android:id/thumbnail",
"is_actionable": false,
"entity": null
},
{
"resource_id": 2131623988,
"view_name": "android.widget.CheckedTextView",
```

```
      "is_checked": false,
      "is_checkable": true,
      "is_actionable": true,
      "entity": null,
      "view_id": "com.ted.android:id/title",
      "view_text": "Sean Gourley: The mathematics of war"
    },
    {
      "resource_id": 2131624042,
      "view_name": "android.widget.ImageView",
      "image_location":
"{\"img_location\":\"\\/mnt\\/sdcard\\/contentscraper\\/images\\/thumbnail_1450254558092.jpeg\"}",
      "view_id": "com.ted.android:id/thumbnail",
      "is_actionable": false,
      "entity": null
    },
    {
      "resource_id": 2131623988,
      "view_name": "android.widget.CheckedTextView",
      "is_checked": false,
      "is_checkable": true,
      "is_actionable": true,
      "entity": null,
      "view_id": "com.ted.android:id/title",
      "view_text": "Mathieu Lehanneur: Science-inspired design"
    },
    {
      "resource_id": 2131624042,
      "view_name": "android.widget.ImageView",
```

```
    "image_location":
"{\"img_location\":\"\/mnt\/sdcard\/contentscraper\/images\/thumbnail_1450254558098.jpeg\
"}",
      "view_id": "com.ted.android:id/thumbnail",
      "is_actionable": false,
      "entity": null
    },
    {
      "resource_id": 2131623988,
      "view_name": "android.widget.CheckedTextView",
      "is_checked": false,
      "is_checkable": true,
      "is_actionable": true,
      "entity": null,
      "view_id": "com.ted.android:id/title",
      "view_text": "Shaffi Mather: A new way to fight corruption"
    },
    {
      "resource_id": 2131624042,
      "view_name": "android.widget.ImageView",
      "image_location":
"{\"img_location\":\"\/mnt\/sdcard\/contentscraper\/images\/thumbnail_1450254558106.jpeg\
"}",
      "view_id": "com.ted.android:id/thumbnail",
      "is_actionable": false,
      "entity": null
    },
    {
      "resource_id": 2131623988,
      "view_name": "android.widget.CheckedTextView",
      "is_checked": false,
```

```
        "is_checkable": true,
        "is_actionable": true,
        "entity": null,
        "view_id": "com.ted.android:id/title",
        "view_text": "Dan Meyer: Math class needs a makeover"
      },
      {
        "resource_id": 2131624042,
        "view_name": "android.widget.ImageView",
        "image_location":
"{\"img_location\":\"\\/mnt\\/sdcard\\/contentscraper\\/images\\/thumbnail_1450254558112.jpeg\
"}",
        "view_id": "com.ted.android:id/thumbnail",
        "is_actionable": false,
        "entity": null
      },
      {
        "resource_id": 2131623988,
        "view_name": "android.widget.CheckedTextView",
        "is_checked": false,
        "is_checkable": true,
        "is_actionable": true,
        "entity": null,
        "view_id": "com.ted.android:id/title",
        "view_text": "Conrad Wolfram: Teaching kids real math with computers"
      }
    ]
  }
},
"timeStats": {
  "start-activity": 138,
```

```
"wait-for-idle": 427,
"fetch_intents": 241,
"wait-for-conditions": 18,
"ale_parse_inputs": 2,
"fetch_access_url_template": 0,
"setup_validation": 7,
"lscrape_agent_time": 945,
"fetch intent_2": 14,
"fetch intent_1": 16,
"fetch intent_4": 43,
"scrape_screen": 79,
"breadcrumb-replay": 18,
"fetch intent_3": 14,
"fetch intent_6": 18,
"fetch intent_5": 20,
"fetch intent_8": 15,
"fetch intent_7": 16,
"wait-for-resources": 0,
"component-replay": 584
},
"access_urls": [
 {
   "packageName": "com.ted.android",
   "component": "com.ted.android.view.activity.TalkDetailActivity",
   "extra": [
    {
      "value": "math",
      "type": "java.lang.String",
      "key": "meta_data"
    },
    {
```

```
      "value": "SEARCH",
      "type": "java.lang.String",
      "key": "source"
    },
    {
      "value": "199",
      "type": "java.lang.Long",
      "key": "id"
    }
  ],
  "targetState": "com.ted.android.view.activity.TalkDetailActivity"
},
{
  "packageName": "com.ted.android",
  "component": "com.ted.android.view.activity.TalkDetailActivity",
  "extra": [
    {
      "value": "math",
      "type": "java.lang.String",
      "key": "meta_data"
    },
    {
      "value": "SEARCH",
      "type": "java.lang.String",
      "key": "source"
    },
    {
      "value": "321",
      "type": "java.lang.Long",
      "key": "id"
    }
```

```
    ],
    "targetState": "com.ted.android.view.activity.TalkDetailActivity"
  },
  {
    "packageName": "com.ted.android",
    "component": "com.ted.android.view.activity.TalkDetailActivity",
    "extra": [
      {
        "value": "math",
        "type": "java.lang.String",
        "key": "meta_data"
      },
      {
        "value": "SEARCH",
        "type": "java.lang.String",
        "key": "source"
      },
      {
        "value": "519",
        "type": "java.lang.Long",
        "key": "id"
      }
    ],
    "targetState": "com.ted.android.view.activity.TalkDetailActivity"
  },
  {
    "packageName": "com.ted.android",
    "component": "com.ted.android.view.activity.TalkDetailActivity",
    "extra": [
      {
        "value": "math",
```

```
    "type": "java.lang.String",
    "key": "meta_data"
  },
  {
    "value": "SEARCH",
    "type": "java.lang.String",
    "key": "source"
  },
  {
    "value": "532",
    "type": "java.lang.Long",
    "key": "id"
  }
 ],
 "targetState": "com.ted.android.view.activity.TalkDetailActivity"
},
{
 "packageName": "com.ted.android",
 "component": "com.ted.android.view.activity.TalkDetailActivity",
 "extra": [
  {
    "value": "math",
    "type": "java.lang.String",
    "key": "meta_data"
  },
  {
    "value": "SEARCH",
    "type": "java.lang.String",
    "key": "source"
  },
  {
```

```
      "value": "691",
      "type": "java.lang.Long",
      "key": "id"
    }
  ],
  "targetState": "com.ted.android.view.activity.TalkDetailActivity"
},
{
  "packageName": "com.ted.android",
  "component": "com.ted.android.view.activity.TalkDetailActivity",
  "extra": [
    {
      "value": "math",
      "type": "java.lang.String",
      "key": "meta_data"
    },
    {
      "value": "SEARCH",
      "type": "java.lang.String",
      "key": "source"
    },
    {
      "value": "717",
      "type": "java.lang.Long",
      "key": "id"
    }
  ],
  "targetState": "com.ted.android.view.activity.TalkDetailActivity"
},
{
  "packageName": "com.ted.android",
```

```
"component": "com.ted.android.view.activity.TalkDetailActivity",
"extra": [
  {
    "value": "math",
    "type": "java.lang.String",
    "key": "meta_data"
  },
  {
    "value": "SEARCH",
    "type": "java.lang.String",
    "key": "source"
  },
  {
    "value": "855",
    "type": "java.lang.Long",
    "key": "id"
  }
],
"targetState": "com.ted.android.view.activity.TalkDetailActivity"
},
{
"packageName": "com.ted.android",
"component": "com.ted.android.view.activity.TalkDetailActivity",
"extra": [
  {
    "value": "math",
    "type": "java.lang.String",
    "key": "meta_data"
  },
  {
    "value": "SEARCH",
```

```
      "type": "java.lang.String",
      "key": "source"
    },
    {
      "value": "1007",
      "type": "java.lang.Long",
      "key": "id"
    }
   ],
   "targetState": "com.ted.android.view.activity.TalkDetailActivity"
  }
 ],
 "access_url_template": "{\n   \"pkg\": \"com.ted.android\",\n   \"component\": \"com.ted.android.view.activity.SearchActivity\",\n   \"targetState\": \"com.ted.android.view.activity.SearchActivity\",\n   \"extra\": [{\n     \"key\": \"query\",\n     \"value\": \"null\"\n   }],\n   \"breadcrumb\": [{\n     \"widgetClass\": \"android.widget.LinearLayout\",\n     \"parentViewID\": \"com.ted.android:id/resultsView\",\n     \"widgetID\": \"com.ted.android:id/talkItem\",\n     \"targetState\": \"com.ted.android.view.activity.TalkDetailActivity\",\n     \"action\": \"click\"\n   }]\n }\n\n"
 }
}
```

What is claimed is:

1. A method in a user device comprising:
    identifying, by at least one processor of the user device, a list of installed native applications that are installed on the user device;
    determining, by the at least one processor, whether a set of crawling conditions are met by the user device;
    in response to the determination that the set of crawling conditions are met by the user device, generating, by the at least one processor on behalf of a content acquisition server, a work request including the list of the installed native applications, wherein the work request corresponds to a request for at least one crawling task to be performed on the user device, and the at least one crawling task is associated with at least one native application from among the installed native applications;
    transmitting, by the at least one processor, the work request to the content acquisition server;
    in response to transmitting the work request, receiving, by the at least one processor, a native application crawling task including an application access mechanism corresponding to a state of a native application from among the installed native applications;
    launching, by the at least one processor, the native application associated with the native application crawling task;
    setting, by the at least one processor, the state of the native application based on the application access mechanism, the native application transmitting a content request to a content server in response to being set to the state;
    receiving, by the at least one processor, content from the content server via the native application; and
    transmitting, by the at least one processor, the content to the content acquisition server,
    wherein the application access mechanism includes:
        a series of commands including a command to launch the native application, and
        a series of other commands replicating at least one user input to set the native application to the state.

2. The method of claim 1, wherein the determining of whether the set of crawling conditions are met includes:
    identifying a version number of the native application; and
    when the version number is greater than a minimum version number of the native application or included in a set of acceptable version numbers of the native application, including an identifier of the native application in the list of the installed native applications.

3. The method of claim 1, wherein the application access mechanism is an application resource identifier.

4. The method of claim 3,
    wherein the launching of the native application includes instructing the native application to launch the native application, and
    wherein the setting of the state includes passing the application resource identifier to the launched native application.

5. The method of claim 4, wherein the transmitting of the content to the content acquisition server includes associating the content with the application resource identifier and transmitting the associated content and the application resource identifier to the content acquisition server.

6. The method of claim 1, wherein the launching of the native application includes instructing the native application to launch the native application, and wherein the setting of the state includes issuing the series of other commands, thereby traversing the native application to the state.

7. The method of claim 1, wherein the determining of whether the set of crawling conditions are met includes at least one of:
    determining that the user device is connected to an external power source;
    determining that the user device is connected to a Wi-Fi connection;
    determining that a display device of the user device is turned off; or
    determining that the user device is not moving.

8. The method of claim 1, wherein the user device is unaffiliated with the content acquisition server and the content server.

9. The method of claim 1, wherein the identifying of the list of the installed native applications includes querying an operating system of the user device, the operating system returning application identifiers of native applications that are installed on the user device and a version number for each installed native application.

10. The method of claim 1, wherein the work request is generated, by the at least one processor independently of the content acquisition server.

11. A computer-readable medium storing a set of computer-readable instructions, the instructions when executed by at least one processor of a user device causing the at least one processor to:
    identify a list of installed native applications that are installed on the user device;
    determine whether a set of crawling conditions are met by the user device;
    in response to the determination that the set of crawling conditions are met by the user device, generate, by the at least one processor on behalf of a content acquisition server, a work request including the list of the installed native applications, wherein the work request corresponds to a request for at least one crawling task to be performed on the user device, and the at least one crawling task is associated with at least one native application from among the installed native applications;
    transmit the work request to the content acquisition server;
    in response to transmitting the work request, receive a native application crawling task including an application access mechanism corresponding to a state of a native application from among the installed native applications;
    launch the native application associated with the native application crawling task;
    set the state of the native application based on the application access mechanism, the native application transmitting a content request to a content server in response to being set to the state;
    receive content from the content server via the native application; and
    transmit the content to the content acquisition server,
    wherein the application access mechanism includes:
        a series of commands including a command to launch the native application, and
        a series of other commands replicating at least one user input to set the native application to the state.

12. The computer-readable medium of claim 11, wherein the determining of whether the set of crawling conditions are met includes:

identifying a version number of the native application; and when the version number is greater than a minimum native application or included in a set of version numbers, including an identifier of the native application in the list of installed native applications.

13. The computer-readable medium of claim 11, wherein the application access mechanism is an application resource identifier.

14. The computer-readable medium of claim 13,
wherein the launching of the native application includes instructing the native application to launch the native application, and
wherein the setting of the state includes passing the application resource identifier to the launched native application.

15. The computer-readable medium of claim 14, wherein the transmitting of the content to the content acquisition server includes associating the content with the application resource identifier and transmitting the associated content and the application resource identifier to the content acquisition server.

16. The computer-readable medium of claim 11, wherein the launching of the native application includes instructing the native application to launch the native application, and wherein the setting of the state includes issuing the series of other commands, thereby traversing the native application to the state.

17. The computer-readable medium of claim 11, wherein the determining of whether the set of crawling conditions are met includes at least one of:
determining that the user device is connected to an external power source;
determining that the user device is connected to a Wi-Fi connection;
determining that a display device of the user device is turned off; or
determining that the user device is not moving.

18. The computer-readable medium of claim 11, wherein the user device is unaffiliated with the content acquisition server and the content server.

19. The computer-readable medium of claim 11, wherein the identifying of the list of the installed native applications includes querying an operating system of the user device, the operating system returning application identifiers of native applications that are installed on the user device and a version number for each installed native application.

20. The method of claim 11, wherein the work request is generated, by the at least one processor, independently of the content acquisition server.

* * * * *